US012613633B2

(12) United States Patent
Ka et al.

(10) Patent No.: US 12,613,633 B2
(45) Date of Patent: Apr. 28, 2026

(54) DATA INPUT AND OUTPUT METHOD AND SEMICONDUCTOR DEVICE USING THE SAME

(71) Applicant: SK hynix Inc., Icheon-si (KR)

(72) Inventors: Dong Yoon Ka, Icheon-si (KR); Min Cheol Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/915,560

(22) Filed: Oct. 15, 2024

(65) Prior Publication Data

US 2025/0362804 A1     Nov. 27, 2025

(30) Foreign Application Priority Data

May 23, 2024     (KR) ........................ 10-2024-0067430

(51) Int. Cl.
*G06F 3/06*          (2006.01)

(52) U.S. Cl.
CPC ............ *G06F 3/061* (2013.01); *G06F 3/0659* (2013.01); *G06F 3/0673* (2013.01)

(58) Field of Classification Search
CPC .... G06F 3/0619; G06F 3/0659; G06F 3/0673; G11C 11/4087; G11C 11/4093; G11C 11/4096; G11C 8/10
See application file for complete search history.

(56) References Cited

U.S. PATENT DOCUMENTS 7,405,985 B2     7/2008  Cernea et al.
2017/0365303 A1*  12/2017  Jo ........................... G11C 29/52

FOREIGN PATENT DOCUMENTS

KR          1020200038145 A       4/2020

* cited by examiner

*Primary Examiner* — Yong J Choe
(74) *Attorney, Agent, or Firm* — WILLIAM PARK AND ASSOCIATES LTD.

(57) ABSTRACT

A semiconductor device includes a memory circuit including a plurality of mats and a meta region and configured to block output of first internal data stored in the plurality of mats based on a column signal and a plurality of flag signals that are generated by performing a computational operation on an address during normal mode and configured to output second internal data from the meta region and a data input and output circuit configured to generate a plurality of data from the first internal data and the second internal data based on a plurality of shifting signals.

29 Claims, 23 Drawing Sheets

RP
GEN

ADD<1:6>

FADD1<1:6>

RP<1:16>

214-2

214-21

SUB
CIR

ADD<1:4>

SADD<1:4>

214-22

FAIL
DET

FADD2<1:4>

RPS<1:16>

FIG. 9

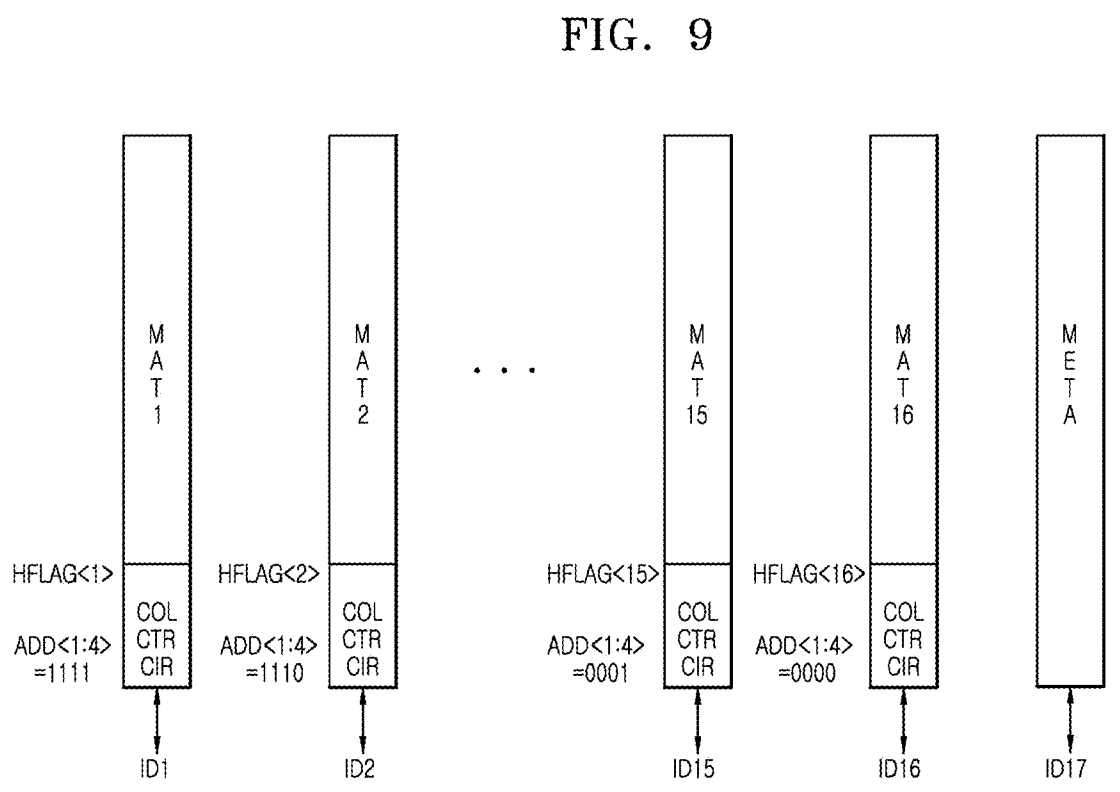

| MAT 1 | MAT 2 | ⋮ | MAT 15 | MAT 16 | META |
|---|---|---|---|---|---|
| COL CTR CIR | COL CTR CIR | | COL CTR CIR | COL CTR CIR | |

HFLAG<1>  ADD<1:4>=1111 → ID1

HFLAG<2>  ADD<1:4>=1110 → ID2

HFLAG<15>  ADD<1:4>=0001 → ID15

HFLAG<16>  ADD<1:4>=0000 → ID16

| YI | MAT 1 | MAT 2 | MAT 3 | MAT 4 | MAT 5 | MAT 6 | MAT 7 | MAT 8 | MAT 9 | MAT 10 | MAT 11 | MAT 12 | MAT 13 | MAT 14 | MAT 15 | MAT 16 | META |
|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | X | 1 |
| 2 | 2 | 2 | 2 | 2 | 2 | 2 | 2 | 2 | 2 | 2 | 2 | 2 | 2 | 2 | 2 | X | 2 |
| 3 | 3 | 3 | 3 | 3 | 3 | 3 | 3 | 3 | 3 | 3 | 3 | 3 | 3 | 3 | 3 | X | 3 |
| 4 | 4 | 4 | 4 | 4 | 4 | 4 | 4 | 4 | 4 | 4 | 4 | 4 | 4 | 4 | 4 | X | 4 |
| 5 | 5 | 5 | 5 | 5 | 5 | 5 | 5 | 5 | 5 | 5 | 5 | 5 | 5 | 5 | X | 1 | 5 |
| 6 | 6 | 6 | 6 | 6 | 6 | 6 | 6 | 6 | 6 | 6 | 6 | 6 | 6 | 6 | X | 2 | 6 |
| 7 | 7 | 7 | 7 | 7 | 7 | 7 | 7 | 7 | 7 | 7 | 7 | 7 | 7 | 7 | X | 3 | 7 |
| 8 | 8 | 8 | 8 | 8 | 8 | 8 | 8 | 8 | 8 | 8 | 8 | 8 | 8 | 8 | X | 4 | 8 |

. . .

| YI | MAT 1 | MAT 2 | MAT 3 | MAT 4 | MAT 5 | MAT 6 | MAT 7 | MAT 8 | MAT 9 | MAT 10 | MAT 11 | MAT 12 | MAT 13 | MAT 14 | MAT 15 | MAT 16 | META |
|---|---|---|---|---|---|---|---|---|---|---|---|---|---|---|---|---|---|
| 57 | 57 | X | 53 | 53 | 53 | 53 | 53 | 53 | 53 | 53 | 53 | 53 | 53 | 53 | 53 | 53 | 57 |
| 58 | 58 | X | 54 | 54 | 54 | 54 | 54 | 54 | 54 | 54 | 54 | 54 | 54 | 54 | 54 | 54 | 58 |
| 59 | 59 | X | 55 | 55 | 55 | 55 | 55 | 55 | 55 | 55 | 55 | 55 | 55 | 55 | 55 | 55 | 59 |
| 60 | 60 | X | 56 | 56 | 56 | 56 | 56 | 56 | 56 | 56 | 56 | 56 | 56 | 56 | 56 | 56 | 60 |

FIG. 12

| YI | MAT 1 | MAT 2 | MAT 3 | MAT 4 | MAT 5 | MAT 6 | MAT 7 | MAT 8 | MAT 9 | MAT 10 | MAT 11 | MAT 12 | MAT 13 | MAT 14 | MAT 15 | MAT 16 | META |
|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 | 3 | 3 | 3 | 3 | 3 | 3 |
| 4 | 4 | 4 | 4 | 4 | 4 | 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 | 5 | 5 | 5 | 5 | 5 | 5 |
| 6 | 6 | 6 | 6 | 6 | 6 | 6 | 6 | 6 | 6 | 6 | 6 | 6 | 6 | 6 | 6 | 6 | 6 |
| 7 | 7 | 7 | 7 | 7 | 7 | 7 | 7 | 7 | 7 | 7 | 7 | 7 | 7 | 7 | 7 | 7 | 7 |
| 8 | 8 | 8 | 8 | 8 | 8 | 8 | 8 | 8 | 8 | 8 | 8 | 8 | 8 | 8 | 8 | 8 | 8 |

. . .

| | | | | | | | | | | | | | | | | | |
|---|---|---|---|---|---|---|---|---|---|---|---|---|---|---|---|---|---|
| 57 | 57 | 57 | 57 | 57 | 57 | 57 | 57 | 57 | 57 | 57 | 57 | 57 | 57 | 57 | 57 | 57 |
| 58 | 58 | 58 | 58 | 58 | 58 | 58 | 58 | 58 | 58 | 58 | 58 | 58 | 58 | 58 | 58 | 58 |
| 59 | 59 | 59 | 59 | 59 | 59 | 59 | 59 | 59 | 59 | 59 | 59 | 59 | 59 | 59 | 59 | 59 |
| 60 | 60 | 60 | 60 | 60 | 60 | 60 | 60 | 60 | 60 | 60 | 60 | 60 | 60 | 60 | 60 | 60 |

Figure 14:
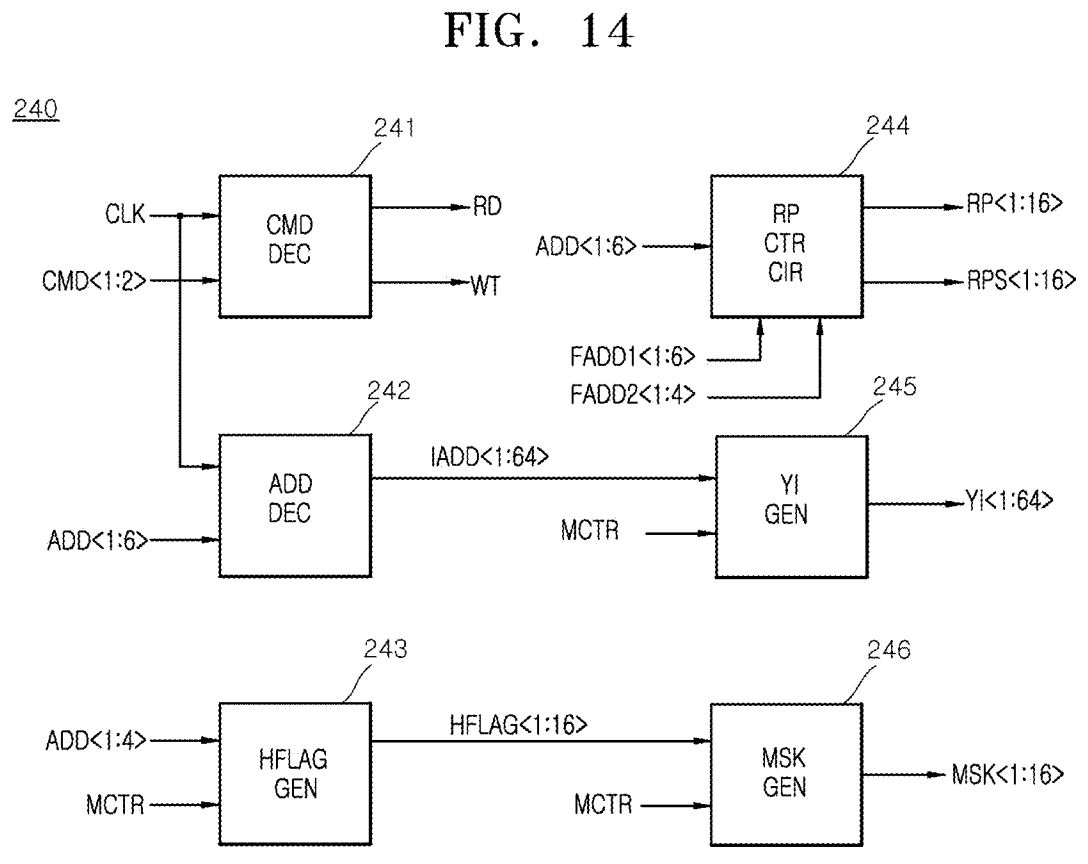

CMD
DEC

CLK

CMD<1:2>

RD

WT

244

RP
CTR
CIR

ADD<1:6>

FADD1<1:6>

FADD2<1:4>

RP<1:16>

RPS<1:16>

242

ADD
DEC

ADD<1:6>

IADD<1:64>

245

YI
GEN

MCTR

YI<1:64>

243

HFLAG
GEN

ADD<1:4>

MCTR

HFLAG<1:16>

246

MSK
GEN

MCTR

MSK<1:16>

Figure 20:
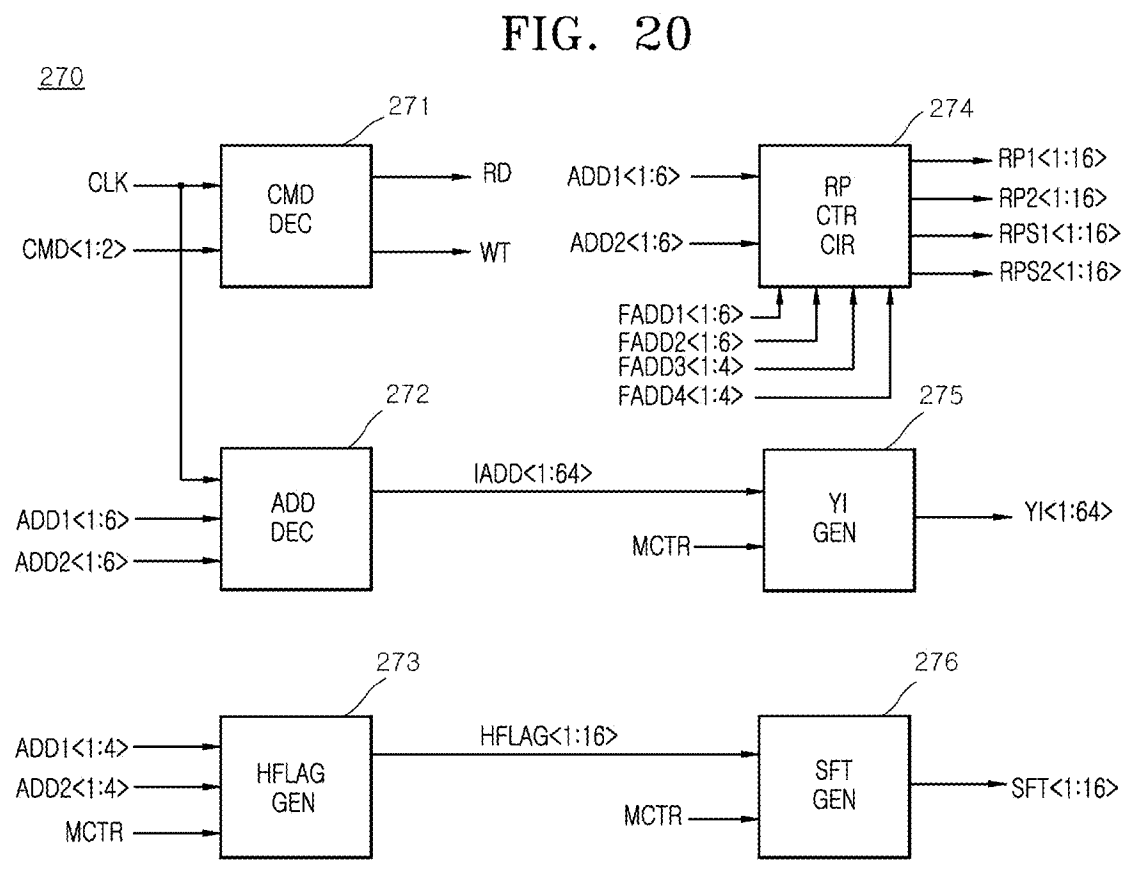

CMD DEC 271

CLK →
CMD<1:2> →

→ RD
→ WT

ADD DEC 272

ADD1<1:6> →
ADD2<1:6> →

→ IADD<1:64>

HFLAG GEN 273

ADD1<1:4> →
ADD2<1:4> →
MCTR →

→ HFLAG<1:16>

RP CTR CIR 274

ADD1<1:6> →
ADD2<1:6> →
FADD1<1:6> →
FADD2<1:6> →
FADD3<1:4> →
FADD4<1:4> →

→ RP1<1:16>
→ RP2<1:16>
→ RPS1<1:16>
→ RPS2<1:16>

YI GEN 275

IADD<1:64> →
MCTR →

→ YI<1:64>

SFT GEN 276

HFLAG<1:16> →
MCTR →

→ SFT<1:16>

DATA INPUT AND OUTPUT METHOD AND SEMICONDUCTOR DEVICE USING THE SAME

CROSS-REFERENCE TO RELATED APPLICATION

The present application claims priority under 35 U.S.C. § 119(a) to Korean Patent Application No. 10-2024-0067430, filed in the Korean Intellectual Property Office on May 23, 2024, the entire contents of which application is incorporated herein by reference.

BACKGROUND

1. Technical Field

The present disclosure relates to a data input and output method that outputs data from a plurality of mats and a meta region and a semiconductor device using the same.

2. Related Art

Recently, DDR2, DDR3, DDR4, and DDR5 methods of inputting and outputting multi-bit data every clock cycle are used to increase the operating speed of a semiconductor device. When the input and output speed of data is increased, the probability of an error occurring during the data transmission process is also increased.

SUMMARY

In an embodiment, a semiconductor device may include a memory circuit including a first mat, a second mat, a third mat, a fourth mat and a meta region and configured to block output of one of first internal data, second internal data, third internal data, and fourth internal data stored in the first mat, the second mat, the third mat, and the fourth mats based on a column signal and a plurality of flag signals that are generated by performing a computational operation on an address during normal mode and configured to output fifth internal data from the meta region and a data input and output circuit configured to generate first data, second data, third data, and fourth data from the first internal data, the second internal data, the third internal data, the fourth internal data, and the fifth internal data based on a plurality of shifting signals.

In an embodiment, a semiconductor device may include a memory circuit including a first mat, a second mat, a third mat, a fourth mat, and a meta region, configured to repair a column line at a location where a fail occurred when an address has a logic level combination that selects a column line at a location where a fail occurred in normal mode, configured to block output of one of first internal data, second internal data, third internal data, and fourth internal data stored in the first mat, the second mat, the third mat, and the fourth mat based on a column signal and a plurality of flag signals that are generated by performing a computational operation on the address, and configured to output fifth internal data from the meta region, and a data input and output circuit configured to generate first data, second data, third data, and fourth data from the first internal data, the second internal data, the third internal data, the fourth internal data, and the fifth internal data based on a plurality of shifting signals.

In an embodiment, a semiconductor device may include a memory control circuit configured to generate a column signal by performing a computational operation on an address based on a meta control signal and configured to generate a plurality of masking signals by performing the computational operation on the address, a memory circuit including a first mat, a second mat, a third mat, a fourth mat, and a meta region, configured to output first internal data, second internal data, third internal data, and fourth internal data stored in the first mat, the second mat, the third mat, and the fourth mats based on the column signal in normal mode, and configured to output fifth internal data from the meta region, and a data input and output circuit configured to generate first data, second data, third data, and fourth data based on the first internal data, the second internal data, the third internal data, the fourth internal data, and the fifth internal data and configured to generate the first data, the second data, the third data, and the fourth data by blocking output of one of the first internal data, the second internal data, the third internal data, the fourth internal data based on the plurality of masking signals.

In an embodiment, a data input and output method may include outputting first internal data, second internal data, third internal data, and fourth internal data stored in a first mat, a second mat, a third mat, and a fourth mat based on a column signal and a plurality of flag signals that are generated by performing a computational operation on an address in normal mode, blocking one of the first internal data, the second internal data, the third internal data, and the fourth internal data and outputting fifth internal data stored in a meta region, and generating first data, second data, third data, and fourth data from the first internal data, the second internal data, the third internal data, the fourth internal data, and the fifth internal data based on a plurality of shifting signals and outputting the first data, the second data, the third data, and the fourth data.

In an embodiment, a semiconductor device may include a memory circuit comprising a plurality of mats and a meta region and configured to block output of first internal data stored in the plurality of mats based on a column signal and a plurality of flag signals that are generated by performing a computational operation on an address during normal mode and configured to output second internal data from the meta region; and a data input and output circuit configured to generate a plurality of data from the first internal data and the second internal data based on a plurality of shifting signals.

BRIEF DESCRIPTION OF THE DRAWINGS

FIG. 4 is a block diagram illustrating an embodiment of a repair control circuit according to an embodiment of the present disclosure.

FIG. 9 is a diagram illustrating data input and output for a memory circuit according to an embodiment of the present disclosure.

FIG. 11 and FIG. 12 are tables including data generated during operation of the semiconductor device according to an embodiment of the present disclosure.

FIG. 13 is a block diagram illustrating an embodiment of a semiconductor device according to an embodiment of the present disclosure.

FIG. 14 is a block diagram illustrating an embodiment of a memory control circuit according to an embodiment of the present disclosure.

FIG. 19 is a block diagram illustrating an embodiment of a semiconductor device according to an embodiment of the present disclosure.

FIG. 20 is a block diagram illustrating an embodiment of a memory control circuit according to an embodiment of the present disclosure.

DETAILED DESCRIPTION

Terms such as "first" and "second" are used to distinguish between various components and do not imply size, order, priority, quantity, or importance of the components. For example, a first component may be referred to as a second component in one example, and the second component may be referred to as a first component in another example.

When one component is identified as "connected" to another component, the components may be connected directly or through an intervening component between the components. When two components are identified as "directly connected," one component is directly connected to the other component without an intervening component between the two components.

A "logic high level" and a "logic low level" are used to describe the logic levels of signals. A signal having a logic high level is distinguished from a signal having a logic low level. For example, when a signal at a first voltage corresponds to a signal having a logic high level, a signal having a second voltage corresponds to a signal having a logic low level. According to an embodiment, a logic high level is a voltage higher than a logic low level. According to an embodiment, the logic levels of signals may be at different logic levels or opposite logic levels. For example, a signal at a logic high level may be at a logic low level in some embodiments, and a signal at a logic low level may be at a logic high level in some embodiments.

A separate apparatus and method for improving the reliability of data transmission are additionally described. A method includes improving reliability of data transmission by generating a signal utilized to check whether an error occurs whenever data are transmitted and transmitting the signal along with the data. The signal capable of checking whether an error occurs is generated by using an error detection code (EDC) that detects an error and an error correction code (ECC) that autonomously corrects an error. A semiconductor device includes a separate region in which data is stored when an error occurs and improves the reliability of data transmission by outputting a signal utilized to check whether an error occurs from the separate region after the start of a data input and output operation.

The present disclosure is described in detail through embodiments. The embodiments are examples that described concepts of the present disclosure, and the scope of the present disclosure is not limited by the embodiments. Embodiments of the present disclosure are described detail with reference to the accompanying drawings. Specific structural or functional descriptions of embodiments are provided as examples to describe concepts that are disclosed in the present application. Examples or embodiments in accordance with the concepts may be carried out in various forms, and the scope of the present disclosure is not limited to the examples or embodiments described in this specification.

Figure 1:
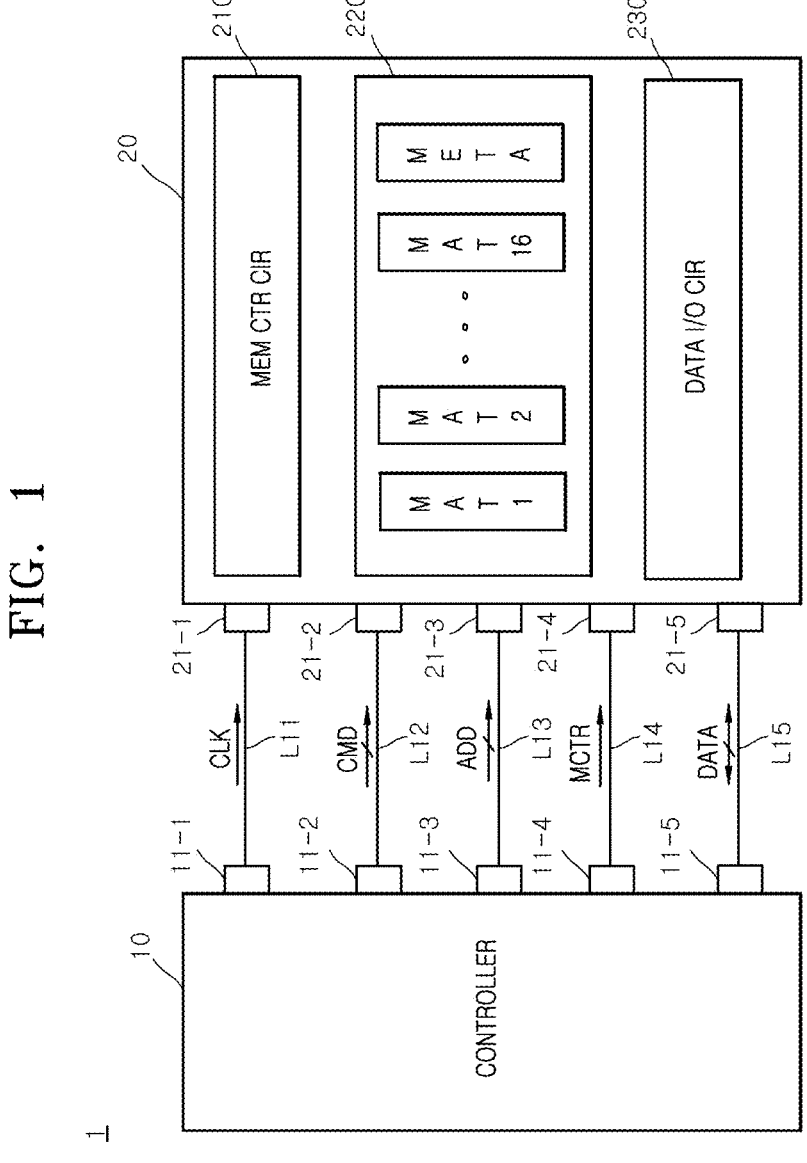
FIG. 1 is a block diagram illustrating a semiconductor system according to an embodiment of the present disclosure.

As illustrated in FIG. 1, a semiconductor system 1 according to an embodiment of the present disclosure includes a controller 10 and a semiconductor device 20.

In an embodiment, the controller 10 includes a first control pin 11-1, a second control pin 11-2, a third control pin 11-3, a fourth control pin 11-4, and a fifth control pin 11-5. In an embodiment, the semiconductor device 20 includes a first device pin 21-1, a second device pin 21-2, a third device pin 21-3, a fourth device pin 21-4, and a fifth device pin 21-5. A first transmission line L11 is connected between the first control pin 11-1 and the first device pin 21-1. A second transmission line L12 is connected between the second control pin 11-2 and the second device pin 21-2. A third transmission line L13 is connected between the third control pin 11-3 and the third device pin 21-3. A fourth transmission line L14 is connected between the fourth control pin 11-4 and the fourth device pin 21-4. A fifth transmission line L15 is connected between the fifth control pin 11-5 and the fifth device pin 21-5.

The controller 10 transmits a clock signal CLK to the semiconductor device 20 via the first transmission line L11. The controller 10 transmits commands CMD that control the semiconductor device 20 to the semiconductor device 20 via the second transmission line L12. The controller 10 transmits addresses ADD that control the semiconductor device 20 to the semiconductor device 20 via the third transmission line L13. The controller 10 transmits a meta control signal MCTR to the semiconductor device 20 via the fourth transmission line L14. The controller 10 transmits data DATA to the semiconductor device 20 via the fifth transmission line L15. The controller 10 receives data DATA from the semiconductor device 20 via the fifth transmission line L15. The clock signal CLK is a signal that is periodically toggled, for example, varied between a logic high level and a logic low level, in order to synchronize operation of the controller 10 and the semiconductor device 20. The command CMD includes multiple bits and is a signal that controls operation of the semiconductor device 20. The address ADD includes multiple bits and is a signal that selects multiple column lines that are included in a memory circuit 220. The meta control signal MCTR is a signal that controls beginning and ending meta mode. The meta control signal MCTR is a signal that is enabled at a logic high level to enter meta mode. Meta mode includes a mode in which a parity signal includes error information for internal data stored into and output from a meta region.

In an embodiment, the semiconductor device 20 includes a memory control circuit (MEM CTR CIR) 210, the memory circuit 220, and a data input and output circuit (DATA I/O CIR) 230.

The memory control circuit 210 controls a read operation and a write operation by transmitting the command CMD in synchronization with the clock signal CLK. The memory control circuit 210 generates a column signal, for example, YI<1:64> in FIG. 2, a flag signal, for example, HFLAG<1:16> in FIG. 2, and a shifting signal, for example, SFT<1:16> in FIG. 2, based on the meta control signal MCTR, and the address ADD in synchronization with the clock signal CLK. The memory control circuit 210 generates the column signal, for example, YI<1:60> in FIG. 2, the flag signal, for example, HFLAG<1:16> in FIG. 2, and the shifting signal, for example, SFT<1:16> in FIG. 2, by performing a computational operation on the address ADD based on the meta control signal MCTR in normal mode. The memory control circuit 210 generates the column signal, for example, YI<1:64> in FIG. 2, by decoding the address ADD based on the meta control signal MCTR during meta mode. The memory control circuit 210 generates a repair signal, for example, RP<1:16> in FIG. 2, and an operation repair signal, for example, RPS<1:16> in FIG. 2, when the address ADD has a logic level combination that selects a column line at a location where a fail occurred.

In an embodiment, the memory circuit 220 includes a first MAT1 through a sixteenth mats MAT16 and a meta region META. For example, a mat includes a subset or subregion of a memory cell or memory bank. For example, a meta region includes a region in which meta data are stored or a region in which internal data are stored, depending on whether meta mode is enabled.

Figure 2:
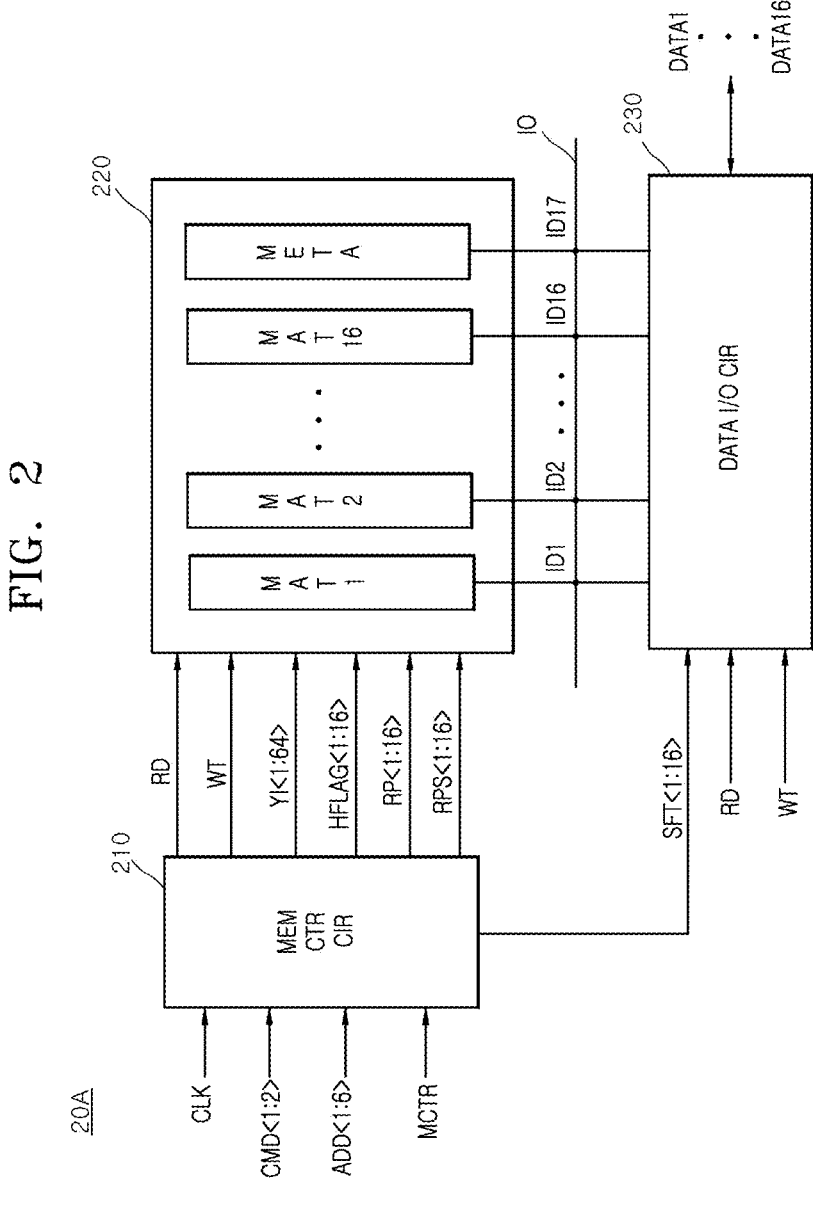
FIG. 2 is a block diagram illustrating an embodiment of a semiconductor device that is included in the semiconductor system according to an embodiment of the present disclosure.

The memory circuit 220 outputs first to sixteenth internal data stored in the first mat MAT1 to the sixteenth mats MAT16, for example, ID1 to ID16 in FIG. 2, based on a read command, for example, RD in FIG. 2 and the column signal, for example, YI<1:60> in FIG. 2 during normal mode. The memory circuit 220 outputs seventeenth internal data stored in the meta region META, for example, ID17 in FIG. 2, based on the read command, for example, RD in FIG. 2 and the column signal, for example, YI<1:60> in FIG. 2 during normal mode. The memory circuit 220 stores the first to sixteenth internal data, for example, ID1 to ID16 in FIG. 2 in the mats MAT1 to MAT16, respectively, based on a write command, for example, WT in FIG. 2 and the column signal, for example, YI<1:60> in FIG. 2 during normal mode. The memory circuit 220 stores the seventeenth internal data, for example, ID17, in FIG. 2 in the meta region META based on the write command, for example, WT in FIG. 2, and the column signal, for example, YI<1:60> in FIG. 2, during normal mode. The seventeenth internal data that are input and output during normal mode, for example, ID17 in FIG. 2, are common data. The memory circuit 220 blocks the output of one of the first to sixteenth internal data stored in the mats MAT1 to MAT16, for example, ID1 to ID16 in FIG. 2, based on the flag signal, for example, HFLAG<1:16> in FIG. 2 during normal mode. The memory circuit 220 repairs a column line at a location where a fail occurred, based on the repair signal, for example, RP<1:16> in FIG. 2, and the operation repair signal, for example, RPS<1:16> in FIG. 2.

The memory circuit 220 outputs the first to sixteenth internal data, for example, ID1 to ID16 in FIG. 2, stored in the mats MAT1 to MAT16 based on the read command, for example, RD in FIG. 2, and the column signal, for example, YI<1:60> in FIG. 2, during meta mode. The memory circuit 220 outputs the seventeenth internal data stored in the meta region META, for example, ID17 in FIG. 2, based on the read command, for example, RD in FIG. 2, and the column signal, for example, YI<1:64> in FIG. 2, during meta mode. The memory circuit 220 stores the first to sixteenth internal data, for example, ID1 to ID16 in FIG. 2, in the mats MAT1 to MAT16, based on the write command, for example, WT in FIG. 2, and the column signal, for example, YI<1:60> in FIG. 2 during meta mode. The memory circuit 220 stores the seventeenth internal data, for example, ID17 in FIG. 2, in the meta region META based on the write command, for example, WT in FIG. 2, and the column signal, for example, YI<1:64> in FIG. 2, during meta mode. The seventeenth internal data, for example, ID17 in FIG. 2, input and output during meta mode are included in a parity signal including error information for the first to sixteenth internal data, for example, ID1 to ID16 in FIG. 2. The seventeenth internal data, for example, ID17 in FIG. 2, that are input and output during meta mode are included in the parity signal, but may be included in a signal including various types of information according to an embodiment.

The data input and output circuit 230 generates the data DATA from the first to seventeenth internal data, for example, ID1 to ID17 in FIG. 2, based on the read command, for example, RD in FIG. 2, and the shifting signal, for example, SFT<1:16> in FIG. 2. The data input and output circuit 230 generates the first to seventeenth internal data, for example, ID1 to ID17 in FIG. 2, from the data DATA based on the write command, for example, WT in FIG. 2, and the shifting signal, for example, SFT<1:16>, in FIG. 2.

FIG. 2 is a block diagram illustrating an embodiment of the semiconductor device 20 that is included, for example, in the semiconductor system 1 shown in FIG. 1. In an embodiment, a semiconductor device 20A includes the memory control circuit 210, the memory circuit 220, and the data input and output circuit 230.

The memory control circuit 210 generates the read command RD and the write command WT based on the first and second bits CMD<1:2> of the command in synchronization with the clock signal CLK. The memory control circuit 210 generates the read command RD, for example, when the first and second bits CMD<1:2> of the command input in synchronization with the clock signal CLK have a logic level combination associated with performing a read operation, for example. The memory control circuit 210 generates the write command WT, for example, when the first and second bits CMD<1:2> of the command input in synchronization with the clock signal CLK have a logic level combination associated with performing a write operation, for example. The memory control circuit 210 generates, in synchronization with the clock signal CLK, the first to sixty-fourth bits YI<1:64> of the column signal, the first to sixteenth bits HFLAG<1:16> of the flag signal, and the first to sixteenth bits SFT<1:16> of the shifting signal, based on the meta control signal MCTR and the first to sixth bits ADD<1:6> of the address. The memory control circuit 210 generates the first to sixtieth bits YI<1:60> of the column signal, the first to sixteenth bits HFLAG<1:16> of the flag signal, and the first to sixteenth bits SFT<1:16> of the shifting signal by performing a computational operation on the first to sixth bits ADD<1:6> of the address based on the meta control signal MCTR during normal mode, for example. The memory control circuit 210 generates the first to sixty-fourth bits YI<1:64> of the column signal by decoding the first to sixth bits ADD<1:6> of the address based on the meta control signal MCTR during meta mode. The memory control circuit 210 generates the first to sixteenth bits RP<1:16> of the repair signal when the first to sixth bits ADD<1:6> of the address have a logic level combination that selects a column line at a location where a fail occurred, for example. The memory control circuit 210 generates the first to sixteenth bits RPS<1:16> of the operation repair signal when the first to fourth bits ADD<1:4> of the address have a logic level combination that selects a column line at a location where a fail occurred, for example.

In an embodiment, the memory circuit 220 includes the first mat MAT1 to the sixteenth mat MAT16 and the meta region META. The first mat MAT1 outputs the first internal data ID1 stored in the first mat to an input and output line IO based on the read command RD and the first to sixtieth bits YI<1:60> of the column signal during normal mode. The first mat MAT1 blocks the output of the first internal data ID1 stored in the first mat based on the first bit HFLAG<1> of the flag signal during normal mode. The first mat MAT1 stores the first internal data ID1 from the input and output line IO based on the write command WT and the first to sixtieth bits YI<1:60> of the column signal during normal mode. The first mat MAT1 outputs the first internal data ID1 stored in the first mat to the input and output line IO based on the read command RD and the first to sixtieth bits YI<1:60> of the column signal during meta mode. The first mat MAT1 substitutes a column line in which a fail occurred with a repair column line based on the first bit RP<1> of the repair signal. The first mat MAT1 substitutes a column line in which a fail occurred with a repair column line based on the first bit RPS<1> of the operation repair signal.

The second mat MAT2 outputs the second internal data ID2 stored in the second mat to the input and output line IO based on the read command RD and the first to sixtieth bits YI<1:60> of the column signal during normal mode. The second mat MAT2 may block the output of the second internal data ID2 stored in the second mat based on the second bit HFLAG<2> of the flag signal during normal mode. The second mat MAT2 stores the second internal data ID2 from the input and output line IO based on the write command WT and the first to sixtieth bits YI<1:60> of the column signal during normal mode. The second mat MAT2 outputs the second internal data ID2 stored in the second mat to the input and output line IO based on the read command RD and the first to sixtieth bits YI<1:60> of the column signal during meta mode. The second mat MAT2 substitutes a column line in which a fail occurred with a repair column line based on the second bit RP<2> of the repair signal. The second mat MAT2 substitutes a column line in which a fail occurred with a repair column line based on the second bit RPS<2> of the operation repair signal.

The third mat MAT3 to the sixteenth mat MAT16 are each implemented with the same circuit as the circuit for the first mat MAT1 and the second mat MAT2 and perform the same operation as the first mat MAT1 and the second mat MAT2, except that the signals that are input to and output from each of the first mat MAT1 and the second mat MAT2 are different from signals that are input to and output from the third mat MAT3 to the sixteenth mat MAT16.

The meta region META outputs the seventeenth internal data ID17 stored in the meta region to the input and output line IO based on the read command RD and the first to sixtieth bits YI<1:60> of the column signal during normal mode. The meta region META stores the seventeenth internal data ID17 from the input and output line IO based on the write command WT and the first to sixtieth bits YI<1:60> of the column signal during normal mode. The meta region META outputs the seventeenth internal data ID17 to the input and output line IO based on the read command RD and the first to sixty-fourth bits YI<1:64> of the column signal during meta mode. The meta region META stores the seventeenth internal data ID17 from the input and output line IO based on the write command WT and the first to sixty-fourth bits YI<1:64> of the column signal during meta mode. The seventeenth internal data that are input and output during normal mode, for example, ID17 in FIG. 2, are common data. The seventeenth internal data ID17 input and output during meta mode are included in a parity signal including error information for the first to sixteenth internal data ID1 to ID16. The seventeenth internal data ID17 that are input and output during meta mode are included in a parity signal, but may be included in a signal including various types of information according to an embodiment.

The memory circuit 220 outputs the first to sixteenth internal data ID1 to ID16 stored in the first to sixteenth mats MAT1 to MAT16 based on the read command RD and the first to sixtieth bits YI<1:60> of the column signal during normal mode. The memory circuit 220 outputs the seventeenth internal data ID17 stored in the meta region META based on the read command RD and the first to sixtieth bits YI<1:60> of the column signal during normal mode. The memory circuit 220 stores the internal data ID1 to ID16 in the mats MAT1 to MAT16, respectively, based on the write command WT and the first to sixtieth bits YI<1:60> of the column signal during normal mode. The memory circuit 220 stores the seventeenth internal data ID17 in the meta region META based on the write command WT and the first to sixtieth bits YI<1:60> of the column signal during normal mode. The memory circuit 220 blocks the output of any of the internal data ID1 to ID16 stored in the mats MAT1 to MAT16 based on the first to sixteenth bits HFLAG<1:16> of the flag signal during normal mode. The memory circuit 220 repairs a column line at a location where a fail occurred based on the first to sixteenth bits RP<1:16> of the repair signal and the first to sixteenth bits RPS<1:16> of the operation repair signal.

The memory circuit 220 outputs the internal data ID1 to ID16 stored in the mats MAT1 to MAT16, based on the read command RD and the first to sixtieth bits YI<1:60> of the column signal during meta mode. The memory circuit 220 outputs the seventeenth internal data ID17 stored in the meta region META, based on the read command RD and the first to sixty-fourth bits YI<1:64> of the column signal during meta mode. The memory circuit 220 stores the internal data ID1 to ID16 in the mats MAT1 to MAT16 based on the write command WT and the first to sixty-fourth bits YI<1:64> of the column signal during meta mode. The memory circuit 220 stores the seventeenth internal data ID17 in the meta region META based on the write command WT and the first to sixty-fourth bits YI<1:64> of the column signal during meta mode.

The data input and output circuit 230 shifts the internal data ID1 to ID16 based on the read command RD and the first to sixteenth bits SFT<1:16> of the shifting signal and generates first data DATA1 to sixteenth data DATA16 from the internal data ID1 to ID16 that are shifted and the seventeenth internal data ID17. The data input and output circuit 230 shifts the data DATA1 to DATA16 based on the write command WT and the first to sixteenth bits SFT<1:16> of the shifting signal and generates the internal data ID1 to ID17 from the data DATA1 to DATA16 that are shifted.

Figure 3:
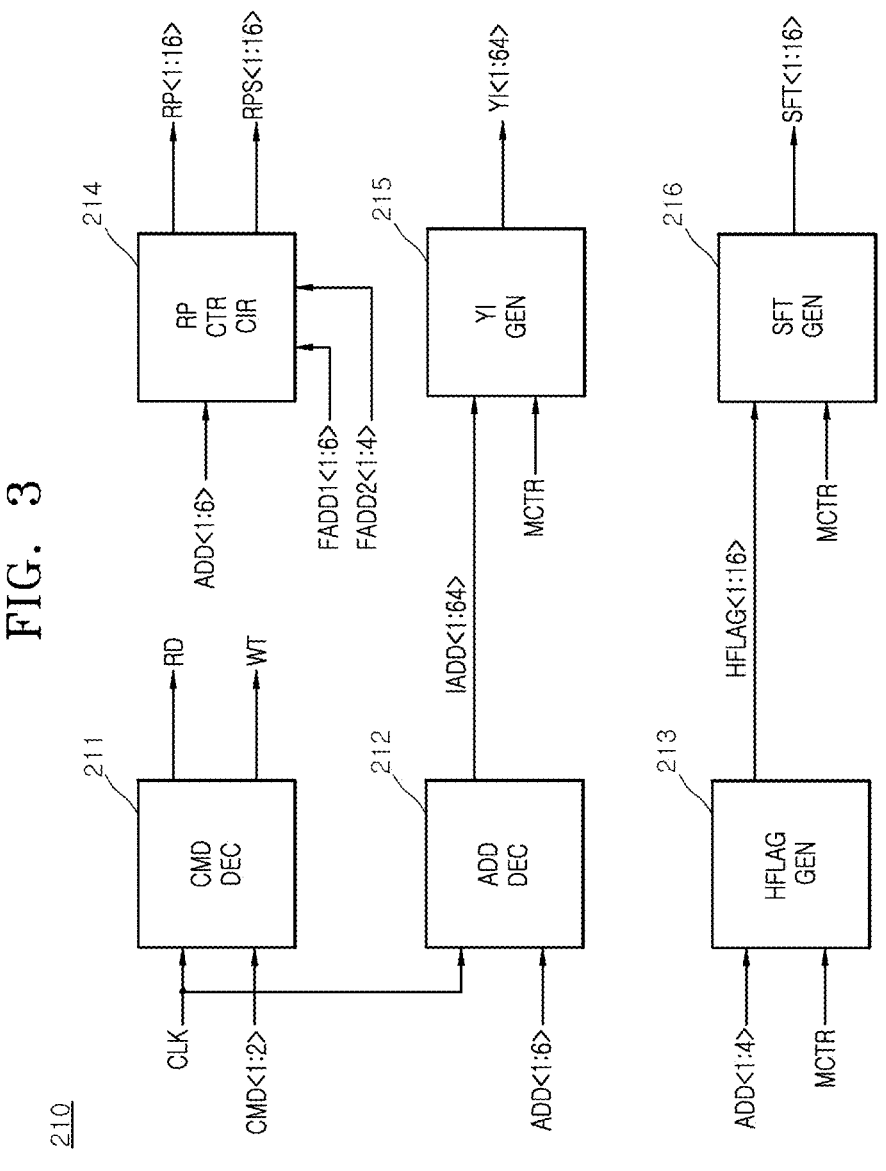
FIG. 3 is a block diagram illustrating an embodiment of a memory control circuit according to an embodiment of the present disclosure.

FIG. 3 is a block diagram illustrating an embodiment of the memory control circuit 210 that is included, for example, in the semiconductor device 20 shown in FIG. 2. In an embodiment, the memory control circuit 210 includes a command decoder (CMD DEC) 211, an address decoder (ADD DEC) 212, a flag signal generation circuit (HFLAG GEN) 213, a repair control circuit (RP CTR CIR) 214, a column signal generation circuit (YI GEN) 215, and a shifting signal generation circuit (SFT GEN) 216.

The command decoder 211 generates the read command RD and the write command WT based on the first and second bits CMD<1:2> of the command in synchronization with the clock signal CLK. The command decoder 211 generates the read command RD, for example, when the first and second bits CMD<1:2> of the command input in synchronization with the clock signal CLK have a logic level combination associated with performing a read operation. The command decoder 211 generates the write command WT, for example, when the first and second bits CMD<1:2> of the command input in synchronization with the clock signal CLK have a logic level combination associated with performing a write operation.

The address decoder 212 generates, in synchronization with the clock signal CLK, the first to sixty-fourth bits IADD<1:64> of an internal address based on the first to sixth bits ADD<1:6> of the address. The address decoder 212 generates, in synchronization with the clock signal CLK, the first to sixty-fourth bits IADD<1:64> of the internal address by decoding the first to sixth bits ADD<1:6> of the address.

The flag signal generation circuit 213 generates the first to sixteenth bits HFLAG<1:16> of the flag signal based on the meta control signal MCTR and the first to fourth bits ADD<1:4> of the address. The flag signal generation circuit 213 generates the first to sixteenth bits HFLAG<1:16> of the flag signal, which are selectively enabled based on a logic level combination of the first to fourth bits ADD<1:4> of the address, during normal mode when the meta control signal MCTR is disabled at a logic low level. The flag signal generation circuit 213 generates the first to sixteenth bits HFLAG<1:16> of the flag signal, each of which is disabled during meta mode when the meta control signal MCTR is disabled at a logic low level.

The flag signal generation circuit 213 generates the first flag signal HFLAG<1> that is enabled when the first to fourth bits ADD<1:4> of the address have a logic level combination 1111 when the meta control signal MCTR is disabled at a logic low level. The flag signal generation circuit 213 generates the second flag signal HFLAG<2> that is enabled when the first to fourth bits ADD<1:4> of the address have a logic level combination 1110 when the meta control signal MCTR is disabled at a logic low level. An example in which the first to fourth bits ADD<1:4> of the address have a logic level combination 1111 indicates that each of the first to fourth bits ADD<1:4> of the address is at a logic high level. An example in which the first to fourth bits ADD<1:4> of the address have a logic level combination 1110 indicates an example in which each of the second to fourth bits ADD<2:4> of the address is at a logic high level and the first bit ADD<1> of the address is at a logic low level. A logic level combination of the first to fourth bits ADD<1:4> of the address associated with generating each of the third to sixteenth bits HFLAG<3:16> of the flag signal may be derived in a similar manner by those skilled in the art from the logic level combination associated with generating each of the first and second bits HFLAG<1:2> of the flag signal.

The repair control circuit 214 generates the first to sixteenth bits RP<1:16> of the repair signal and the first to sixteenth bits RPS<1:16> of the operation repair signal when the first to sixth bits ADD<1:6> of the address have a logic level combination that selects a column line at a location where a fail occurred, for example. The repair control circuit 214 generates the first to sixteenth bits RP<1:16> of the repair signal, which are enabled when the first to sixth bits ADD<1:6> of the address have the same logic level combination as the first to sixth bits FADD1<1:6> of a fail address. The repair control circuit 214 generates the first to sixteenth bits RPS<1:16> of the operation repair signal, which are enabled when a logic level combination of the first to fourth bits ADD<1:4> of the address on which a computational operation was performed is identical with a logic level combination of the first to fourth bits FADD2<1:4> of an operation fail address. The first to sixth bits FADD1<1:6> of the fail address are included in a signal that is generated with a logic level combination for a column line in which a fail occurred. The first to fourth bits FADD2<1:4> of the operation fail address are included in a signal that is generated with a logic level combination for a column line in which a fail occurred. The first to sixth bits FADD1<1:6> of the fail address and the first to fourth bits FADD2<1:4> of the operation fail address may be included in a signal that is generated from a fuse array (not illustrated) that is included within the semiconductor device 20.

The column signal generation circuit 215 generates the first to sixty-fourth bits YI<1:64> of the column signal based on the meta control signal MCTR and the first to sixty-fourth bits IADD<1:64> of the internal address. The column signal generation circuit 215 generates the first to sixtieth bits YI<1:60> of the column signal by performing a computational operation on the first to sixty-fourth bits IADD<1:64> of the internal address during normal mode when the meta control signal MCTR is disabled. The column signal generation circuit 215 generates the first to sixty-fourth bits YI<1:64> of the column signal from the first to sixty-fourth bits IADD<1:64> of the internal address during meta mode when the meta control signal MCTR is enabled. The computational operation may be a subtraction operation. During the computational operation according to an embodiment of the present disclosure, an operation including subtracting from the first to sixty-fourth bits IADD<1:64> of the internal address may be performing a subtraction operation by −4. The computational operation according to an embodiment of the present disclosure includes an example in which a subtraction by −4N operation is performed on the first to sixty-fourth bits IADD<1:64> of the internal address. N is an integer greater than 0. According to an embodiment, a computational operation may be an addition operation.

The shifting signal generation circuit 216 generates the first to sixteenth bits SFT<1:16> of a shifting signal, based on the meta control signal MCTR and the first to sixteenth bits HFLAG<1:16> of the flag signal. The shifting signal generation circuit 216 generates the first to sixteenth bits SFT<1:16> of the shifting signal based on the first to sixteenth bits HFLAG<1:16> of the flag signal during normal mode when the meta control signal MCTR is disabled. The shifting signal generation circuit 216 generates the first to sixteenth bits SFT<1:16> of the shifting signal, each of which is disabled at a logic low level during meta mode when the meta control signal MCTR is enabled.

For example, the shifting signal generation circuit 216 generates the first and second bits SFT<1:2> of the shifting signal, which are disabled at a logic low level, and the third to sixteenth bits SFT<3:16> of the shifting signal, which are enabled at a logic high level, when the third bit HFLAG<3> of the flag signal is enabled at a logic high level during normal mode. The shifting signal generation circuit 216 generates the first to ninth bits SFT<1:9> of the shifting signal, which are disabled at a logic low level, and the tenth to sixteenth bits SFT<10:16> of the shifting signal, which are enabled at a logic high level, when the tenth bit HFLAG<10> of the flag signal is enabled at a logic high level during normal mode.

Figure 4:
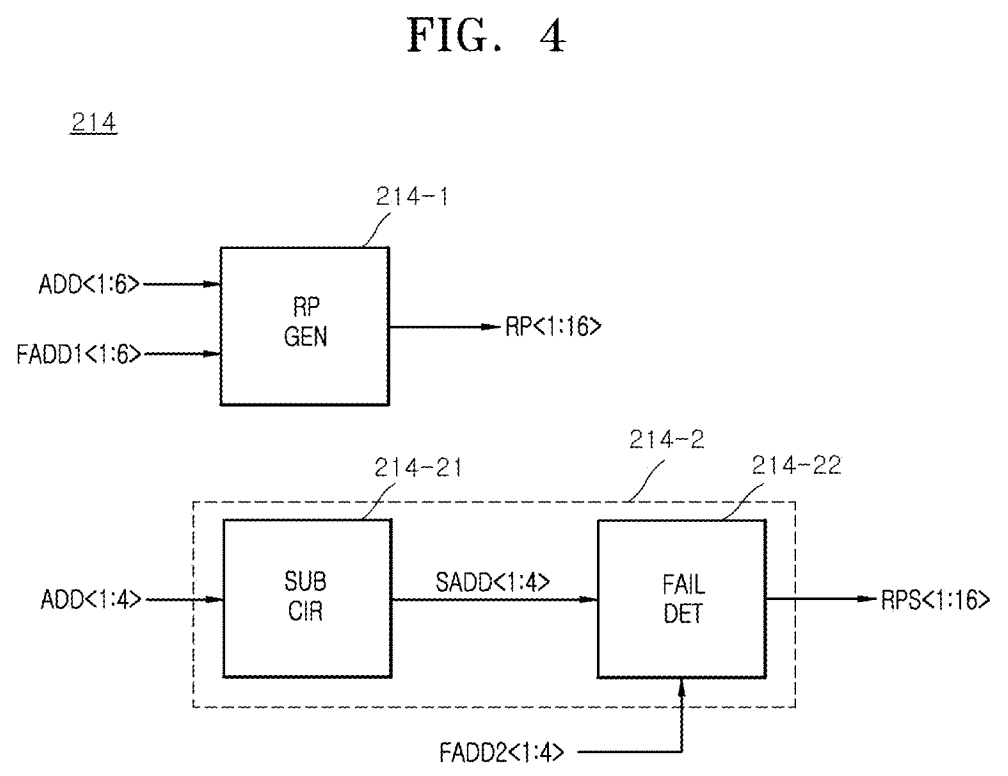

FIG. 4 is a block diagram illustrating an embodiment of the repair control circuit 214 that is included, for example, in the memory control circuit 210 shown in FIG. 3. In an embodiment, the repair control circuit 214 includes a repair signal generation circuit (RP GEN) 214-1 and an operation repair signal generation circuit 214-2.

The repair signal generation circuit 214-1 generates the first to sixteenth bits RP<1:16> of the repair signal by comparing the first to sixth bits ADD<1:6> of the address and the first to sixth bits FADD1<1:6> of the fail address. The repair signal generation circuit 214-1 generates the first to sixteenth bits RP<1:16> of the repair signal, which are enabled when the first to sixth bits ADD<1:6> of the address have the same logic level combination as the first to sixth bits FADD1<1:6> of the fail address.

In an embodiment, the operation repair signal generation circuit 214-2 includes a subtraction circuit (SUB CIR) 214-21 and a fail detection circuit (FAIL DET) 214-22.

The subtraction circuit 214-21 generates the first to fourth bits SADD<1:4> of a subtraction address by performing a computational operation on the first to fourth bits ADD<1:4> of the address. The subtraction circuit 214-21 generates the first to fourth bits SADD<1:4> of the subtraction address by performing a subtraction by −4 operation on the first to fourth bits ADD<1:4> of the address.

The fail detection circuit 214-22 generates the first to sixteenth bits RPS<1:16> of the operation repair signal by comparing the first to fourth bits SADD<1:4> of the subtraction address and the first to fourth bits FADD2<1:4> of the operation fail address. The fail detection circuit 214-22 generates the first to sixteenth bits RPS<1:16> of the operation repair signal, which are enabled when the first to fourth bits SADD<1:4> of the subtraction address have the same logic level combination as the first to fourth bits FADD2<1:4> of the operation fail address.

Figure 5:
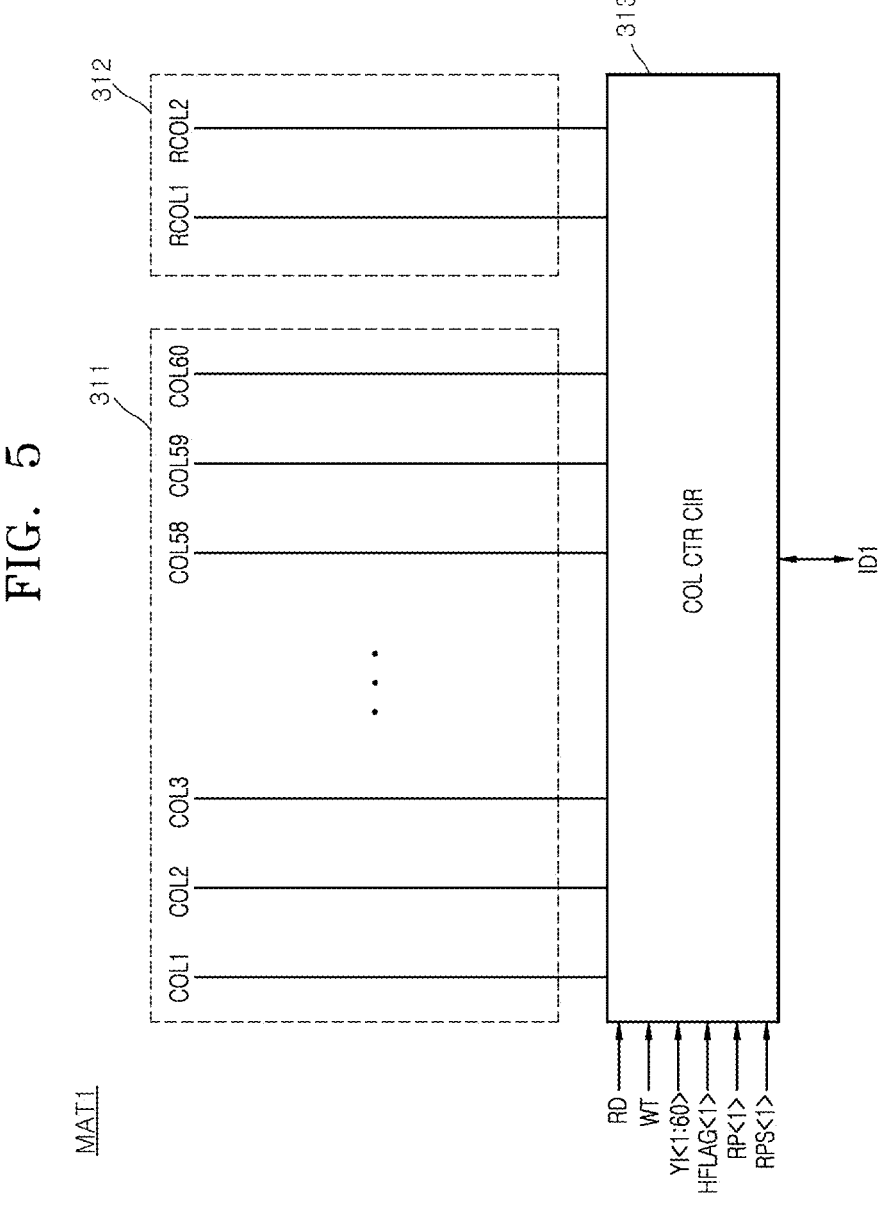
FIG. 5 is a block diagram illustrating an embodiment of a first mat that is included in a memory circuit according to an embodiment of the present disclosure.

FIG. 5 is a block diagram illustrating an embodiment of the first mat MAT1 that is included, for example, in the memory circuit 220 shown in FIG. 2. In an embodiment, the first mat MAT1 includes a memory cell array 311, a repair region 312, and a column control circuit (COL CTR CIR) 313.

In an embodiment, the memory cell array 311 includes a first column line COL1 to a sixtieth column line COL60. A plurality of memory cells (not illustrated) is connected to each of the column lines COL1 to COL60. The plurality of memory cells (not illustrated) that are connected to the column lines COL1 to COL60 outputs the first internal data ID1 after the start of a read operation during normal operation. The plurality of memory cells (not illustrated) that are connected to the column lines COL1 to COL60 stores the first internal data ID1 after the start of a write operation during normal operation. In an embodiment, the memory cell array 311 includes a first quantity of column lines, such as 60 column lines. The quantity of column lines that are included in the memory cell array 311 may vary according to an embodiment.

In an embodiment, the repair region 312 includes a first repair column line RCOL1 and a second repair column line RCOL2. A plurality of memory cells (not illustrated) is connected to each of the repair column lines RCOL1 and RCOL2. The first repair column line RCOL1 is a column line substituted for a column line in which a fail occurred, among the column lines COL1 to COL60, when the first bit RP<1> of the repair signal is enabled. The second repair column line RCOL2 is a column line substituted for a column line in which a fail occurred, among the column lines COL1 to COL60, when the first bit RPS<1> of the operation repair signal is enabled.

The column control circuit 313 is electrically connected to the first to sixtieth column lines COL1 to COL60 and the first and second repair column lines RCOL1 and RCOL2.

The column control circuit 313 outputs the first internal data ID1 stored in a plurality of memory cells (not illustrated) by connecting one of the first to sixtieth column lines COL1 to COL60 based on the first to sixtieth bits YI<1:60> of the column signal when the read command RD is enabled. The column control circuit 313 blocks the output of the first internal data ID1 when the read command RD is enabled and the first flag signal HFLAG<1> is enabled. The column control circuit 313 substitutes a column line in which a fail occurred, among the first to sixtieth column lines COL1 to COL60, with the first repair column line RCOL1 when the read command RD is enabled and the first bit RP<1> of the repair signal is enabled. The column control circuit 313 is connected to the first repair column line RCOL1 when the read command RD is enabled and outputs the first internal data ID1 stored in the plurality of memory cells (not illustrated). The column control circuit 313 substitutes a column line in which a fail occurred, among the first to sixtieth column lines COL1 to COL60, with the second repair column line RCOL2 when the read command RD is enabled and the first bit RPS<1> of the operation repair signal is enabled. The column control circuit 313 is connected to the second repair column line RCOL2 when the read command RD is enabled and outputs the first internal data ID1 stored in the plurality of memory cells (not illustrated).

The column control circuit 313 stores the first internal data ID1 in the plurality of memory cells by connecting one of the first to sixtieth column lines COL1 to COL60 based on the first to sixtieth bits YI<1:60> of the column signal when the write command WT is enabled. The column control circuit 313 blocks the input of the first internal data ID1 when the write command WT is enabled and the first bit HFLAG<1> of the flag signal is enabled. The column control circuit 313 substitutes a column line in which a fail occurred, among the first to sixtieth column lines COL1 to COL60, with the first repair column line RCOL1 when the write command RD is enabled and the first bit RP<1> of the repair signal is enabled. The column control circuit 313 is connected to the first repair column line RCOL1 when the write command WT is enabled and stores the first internal data ID1 in the plurality of memory cells. The column control circuit 313 substitutes a column line in which a fail occurred, among the first to sixtieth column lines COL1 to COL60, with the second repair column line RCOL2 when the write command WT is enabled and the first bit RPS<1> of the operation repair signal is enabled. The column control circuit 313 is connected to the second repair column line RCOL2 when the write command WT is enabled, and stores the first internal data ID1 in the plurality of memory cells.

Each of the second mat MAT2 through the sixteenth mat MAT16 are implemented with the same circuit as the circuit of the first mat MAT1 illustrated in FIG. 5 and performs the same operation as the first mat MAT1, except that signals that are input to and output from the first mat MAT1 are different from signals that are input to and output from each of the second to sixteenth mats MAT2 to MAT16.

Figure 6:
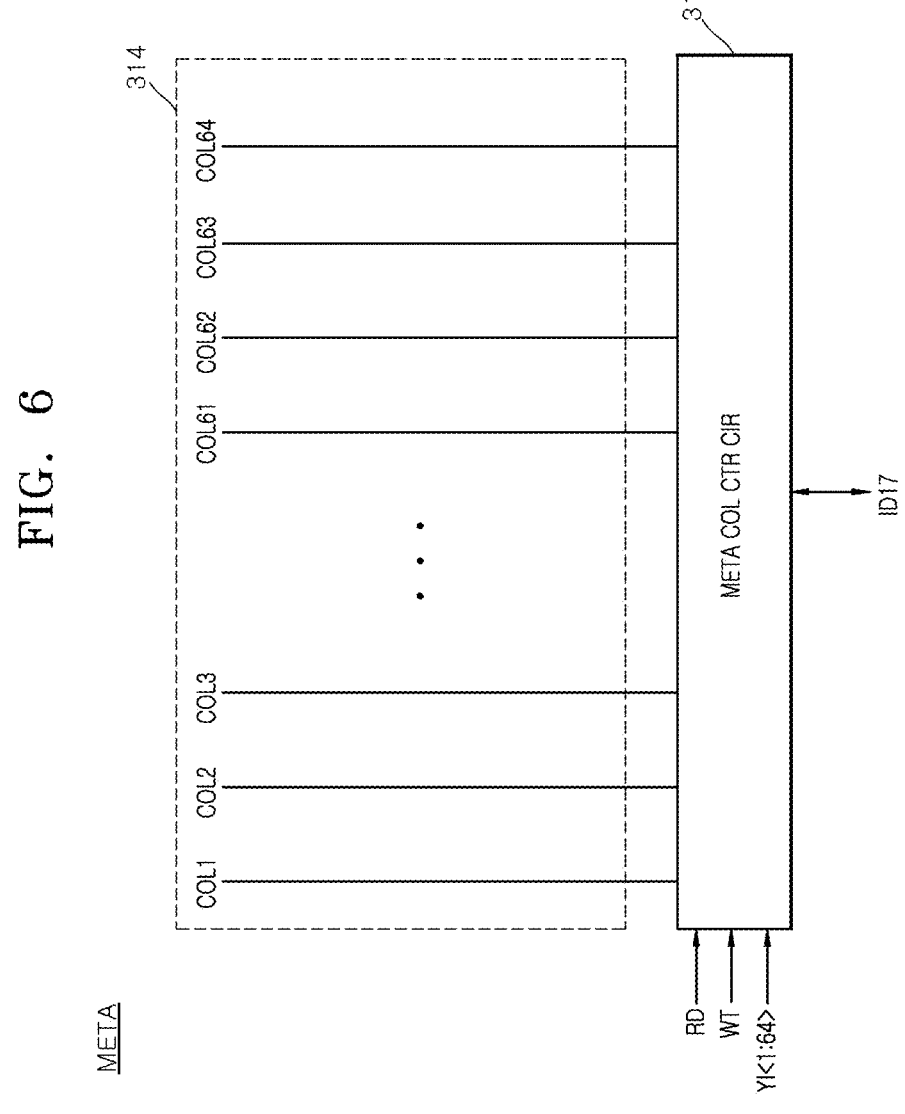
FIG. 6 is a block diagram illustrating an embodiment of a meta region of a memory circuit according to an embodiment of the present disclosure.

FIG. 6 is a block diagram illustrating an embodiment of the meta region META that is included, for example, in the memory circuit 220 shown in FIG. 2. In an embodiment, the meta region META includes a meta memory cell array 314 and a meta column control circuit (META COL CTR CIR) 315.

In an embodiment, the meta memory cell array 314 includes a first column line COL1 to a sixty-fourth column line COL64. A plurality of memory cells (not illustrated) is connected to each of the column lines COL1 to COL64. The plurality of memory cells (not illustrated) that are connected to the column lines COL1 to COL64 outputs the seventeenth internal data ID17 after the start of a read operation during normal operation. The plurality of memory cells that are connected to the column lines COL1 to COL64 stores the seventeenth internal data ID17 after the start of a write operation during normal operation. In an embodiment, the meta memory cell array 314 includes a second quantity of column lines, such as 64 column lines. The quantity of column lines that are included in the meta memory cell array 314 may vary according to an embodiment. Operations of the sixty-first column line COL61 to the sixty-fourth column line COL64 that are included in the meta memory cell array 314 are blocked after the start of meta operation, such that the seventeenth internal data ID17 cannot be input to and output from the sixty-first column line COL61 to the sixty-fourth column line COL64.

The meta column control circuit 315 is electrically connected to the column lines COL1 to COL64.

The meta column control circuit 315 outputs the seventeenth internal data ID7 stored in the plurality of memory cells (not illustrated) by connecting one of the first to sixty-fourth column lines COL1 to COL64 based on the first to sixty-fourth bits YI<1:64> of the column signal when the read command RD is enabled.

The meta column control circuit 315 stores the seventeenth internal data ID7 in the plurality of memory cells (not illustrated) by connecting one of the first to sixty-fourth column lines COL1 to COL64 based on the first to sixty-fourth bits YI<1:64> of the column signal when the write command WT is enabled.

Figure 7:
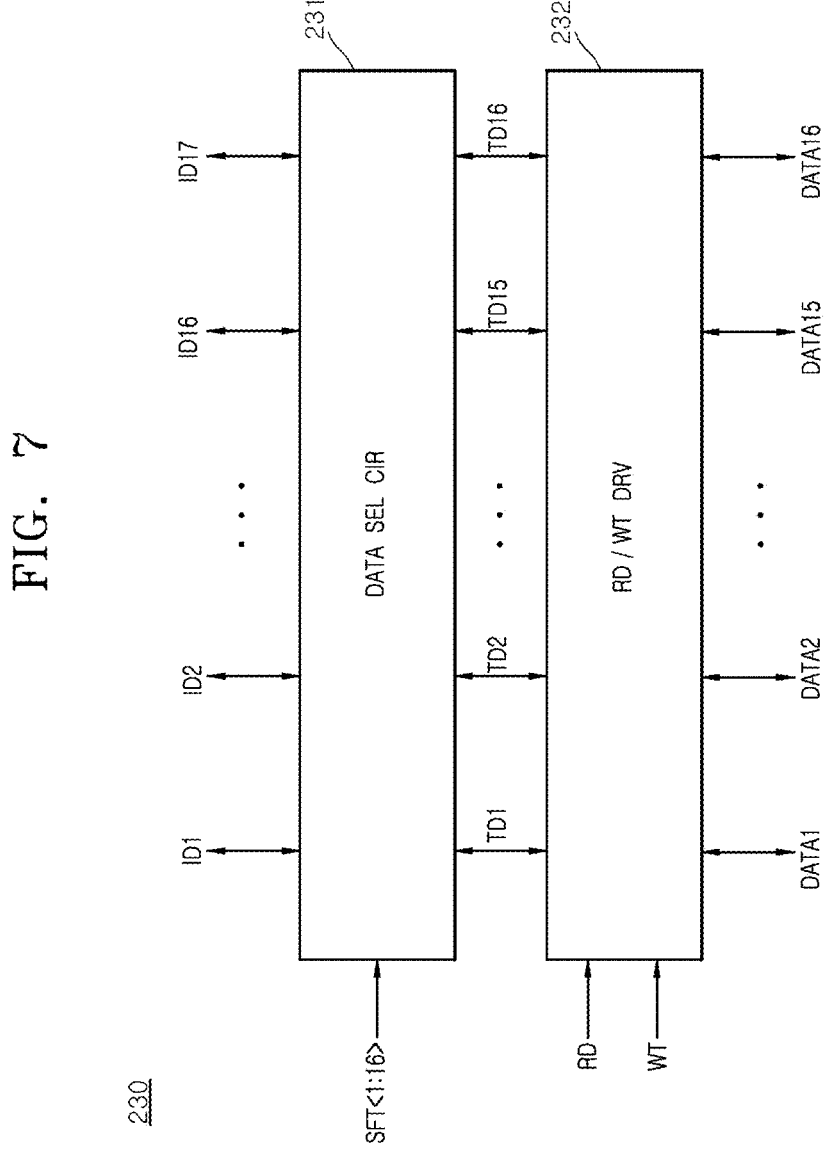
FIG. 7 is a block diagram illustrating an embodiment of a data input and output circuit according to an embodiment of the present disclosure.

FIG. 7 is a block diagram illustrating an embodiment of the data input and output circuit 230 that is included, for example, in the semiconductor device 20 shown in FIG. 2. In an embodiment, the data input and output circuit 230 includes a data selection circuit (DATA SEL CIR) 231 and a read write driving circuit (RD/WT DRV) 232.

The data selection circuit 231 generates first transfer data TD1 to sixteenth transfer data TD16 based on the internal data ID1 to ID17 from the input and output line IO during a read operation. The data selection circuit 231 shifts the internal data ID1 to ID16 based on the first to sixteenth bits SFT<1:16> of the shifting signal during a read operation. The data selection circuit 231 generates the transfer data TD1 to TD16 based on the internal data ID1 to ID16 that are shifted and the seventeenth internal data ID17 during a read operation.

The data selection circuit 231 generates the internal data ID1 to ID17 based on the transfer data TD1 to TD16 and outputs the internal data ID1 to ID17 to the input and output line IO during a write operation. The data selection circuit 231 shifts the transfer data TD1 to TD16 based on the first to sixteenth bits SFT<1:16> of the shifting signal during a write operation. The data selection circuit 231 generates the internal data ID1 to ID17 based on the transfer data TD1 to TD16 that are shifted during a write operation.

The read write driving circuit 232 generates the first data DATA1 to the sixteenth data DATA16 from the transfer data TD1 to TD16, respectively, when the read command RD is enabled. The read write driving circuit 232 outputs the data DATA1 to DATA16 to the controller 10 when the read command RD is enabled.

The read write driving circuit 232 generates the transfer data TD1 to TD16 from the data DATA1 to DATA16 when the write command WT is enabled. The read write driving circuit 232 outputs the transfer data TD1 to TD16 to the data selection circuit 231 when the write command RD is enabled.

Figure 8:
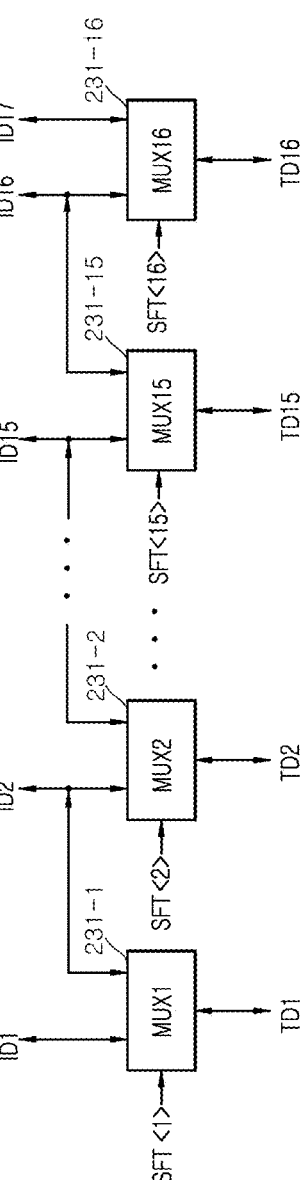
FIG. 8 is a block diagram illustrating an embodiment of a data selection circuit according to an embodiment of the present disclosure.

FIG. 8 is a block diagram illustrating an embodiment of the data selection circuit 231 that is included, for example, in the data input and output circuit 230 shown in FIG. 7. In an embodiment, the data selection circuit 231 includes a first multiplexer (MUX1) 231-1 through a sixteenth multiplexer (MUX16) 231-16.

The first multiplexer 231-1 generates the first transfer data TD1 from one of the first internal data ID1 and the second internal data ID2 based on the first bit SFT<1> of the shifting signal during a read operation. The first multiplexer 231-1 generates the first transfer data TD1 from the first internal data ID1 when the first bit SFT<1> of the shifting signal is disabled at a logic low level during a read operation. The first multiplexer 231-1 generates the first transfer data TD1 from the second internal data ID2 when the first bit SFT<1> of the shifting signal is enabled at a logic high level during a read operation. The first multiplexer 231-1 generates one of the first internal data ID1 and the second internal data ID2 from the first transfer data TD1 based on the first bit SFT<1> of the shifting signal during a write operation. The first multiplexer 231-1 generates the first internal data ID1 from the first transfer data TD1 when the first bit SFT<1> of the shifting signal is disabled at a logic low level during a write operation. The first multiplexer 231-1 generates the second internal data ID2 from the first transfer data TD1 when the first bit SFT<1> of the shifting signal is enabled at a logic high level during a write operation.

The second multiplexer 231-2 generates the second transfer data TD2 from one of the second internal data ID2 and the third internal data ID3 based on the second bit SFT<2> of the shifting signal during a read operation. The second multiplexer 231-2 generates the second transfer data TD2 from the second internal data ID2 when the second bit SFT<2> of the shifting signal is disabled at a logic low level during a read operation. The second multiplexer 231-2 generates the second transfer data TD2 from the third internal data ID3 when the second bit SFT<2> of the shifting signal is enabled at a logic high level during a read operation. The second multiplexer 231-2 generates one of the second internal data ID2 and the third internal data ID3 from the second transfer data TD2 based on the second bit SFT<2> of the shifting signal during a write operation. The second multiplexer 231-2 generates the second internal data ID2 from the second transfer data TD2 when the second bit SFT<2> of the shifting signal is disabled at a logic low level during a write operation. The second multiplexer 231-2 generates the third internal data ID3 from the second transfer data TD2 when the second bit SFT<2> of the shifting signal is enabled at a logic high level during a write operation.

Each of the third multiplexer 231-3 through the fifteenth multiplexer 231-15 is implemented with the same circuit as the circuit of the multiplexers 231-1 and 231-2 and performs the same operation as the multiplexers 231-1 and 231-2, except that the signals that are input to and output from the multiplexers 231-1 and 231-2 are different from signals that are input to and output from the third multiplexers 231-3 to the fifteenth multiplexer 231-15.

The sixteenth multiplexer 231-16 generates the sixteenth transfer data TD16 from one of the sixteenth internal data ID16 and the seventeenth internal data ID17 based on the sixteenth bit SFT<16> of the shifting signal during a read operation. The sixteenth multiplexer 231-16 generates the sixteenth transfer data TD16 from the sixteenth internal data ID16 when the sixteenth bit SFT<16> of the shifting signal is disabled at a logic low level during a read operation. The sixteenth multiplexer 231-16 generates the sixteenth transfer data TD16 from the seventeenth internal data ID17 when the sixteenth bit SFT<16> of the shifting signal is enabled at a logic high level during a read operation. The sixteenth multiplexer 231-16 generates one of the sixteenth internal data ID16 and the seventeenth internal data ID17 from the sixteenth transfer data TD16 based on the sixteenth bit SFT<16> of the shifting signal during a write operation. The sixteenth multiplexer 231-16 generates the sixteenth internal data ID16 from the sixteenth transfer data TD16 when the sixteenth bit SFT<16> of the shifting signal is disabled at a logic low level during a write operation. The sixteenth multiplexer 231-16 generates the seventeenth internal data ID17 from the sixteenth transfer data TD16 when the sixteenth bit SFT<16> of the shifting signal is enabled at a logic high level during a write operation.

FIG. 9 is a diagram illustrating data input and output for the memory circuit 220 according to an embodiment of the present disclosure. An operation including inputting and outputting the internal data ID1 to ID17 based on the first to sixteenth bits HFLAG<1:16> of the flag signal in the memory circuit 220 according to an embodiment of the present disclosure is described with reference to FIG. 9.

A column control circuit COL CTR CIR that is included in the first mat MAT1 blocks the input and output of the first internal data ID1 when the first bit HFLAG<1> of the flag signal is enabled at a logic high level during normal operation. A column control circuit COL CTR CIR that is included in the first mat MAT1 inputs and outputs the first internal data ID1 when the first bit HFLAG<1> of the flag signal is disabled at a logic low level during normal operation. A logic level combination of the first to fourth bits ADD<1:4> of the address on which the first bit HFLAG<1> of the flag signal is enabled at a logic high level is 1111. The logic level combination 1111 for the first to fourth bits ADD<1:4> of the address indicates that the first bit ADD<1> of the address is at a logic high level, the second bit ADD<2> of the address is at a logic high level, the third bit ADD<3> of the address is at a logic high level, and the fourth bit ADD<4> of the address is at a logic high level.

A column control circuit COL CTR CIR that is included in the second mat MAT2 blocks the input and output of the second internal data ID2 when the second bit HFLAG<2> of the flag signal is enabled at a logic high level during normal operation. The column control circuit COL CTR CIR that is included in the second mat MAT2 inputs and outputs the second internal data ID2 when the second bit HFLAG<2> of the flag signal is disabled at a logic low level during normal operation. A logic level combination of the first to fourth bits ADD<1:4> of the address on which the second bit HFLAG<2> of the flag signal is enabled at a logic high level is 1110. The logic level combination 1110 of the first to fourth bits ADD<1:4> of the address indicates that the first bit ADD<1> of the address is at a logic low level, the second bit ADD<2> of the address is at a logic high level, the third bit ADD<3> of the address is at a logic high level, and the fourth bit ADD<4> of the address is at a logic high level.

An operation including inputting and outputting each of the third internal data ID3 through the fourteenth internal data ID14 based on each of the third to fourteenth bits HFLAG<3:14> of the flag signal in the third to fourteenth mats MAT3 to MAT14 and the first to fourth bits ADD<1:4> is similar to the operation of the first mat MAT1 and the second mat MAT2.

A column control circuit COL CTR CIR that is included in the fifteenth mat MAT15 blocks the input and output of the fifteenth internal data ID15 when the fifteenth bit HFLAG<15> of the flag signal is enabled at a logic high level during normal operation. The column control circuit COL CTR CIR that is included in the fifteenth mat MAT15 inputs and outputs the fifteenth internal data ID15 when the fifteenth bit HFLAG<15> of the flag signal is disabled at a logic low level during normal operation. A logic level combination of the first to fourth bits ADD<1:4> of the address on which the fifteenth bit HFLAG<15> of the flag signal is enabled at a logic high level is 0001. The logic level combination 0001 of the first to fourth bits ADD<1:4> of the address indicates that the first bit ADD<1> of the address is at a logic high level, the second bit ADD<2> of the address is at a logic low level, the third bit ADD<3> of the address is at a logic low level, and the fourth bit ADD<4> of the address is at a logic low level.

A column control circuit COL CTR CIR that is included in the sixteenth mat MAT16 blocks the input and output of the sixteenth internal data ID16 when the sixteenth bit HFLAG<16> of the flag signal is enabled at a logic high level during normal operation. The column control circuit COL CTR CIR that is included in the sixteenth mat MAT16 inputs and outputs the sixteenth internal data ID16 when the sixteenth bit HFLAG<16> of the flag signal is disabled at a logic low level during normal operation. A logic level combination of the first to fourth bits ADD<1:4> of the address on which the sixteenth bit HFLAG<16> of the flag signal is enabled at a logic high level is 0000. The logic level combination 0000 of the first to fourth bits ADD<1:4> of the address means that the first bit ADD<1> of the address is at a logic low level, the second bit ADD<2> of the address is at a logic low level, the third bit ADD<3> of the address is at a logic low level, and the fourth bit ADD<4> of the address is at a logic low level.

The meta region META inputs and outputs the seventeenth internal data ID17 during normal operation.

As described above, the semiconductor system 1 according to an embodiment of the present disclosure uses the meta region META, in which meta data are stored, as a region in which meta data are stored or a region in which internal data are stored, depending on whether meta mode is enabled. The semiconductor system 1 may reduce the quantity of column lines of a mat in which internal data are stored and may reduce an area by using the meta region META in which meta data are stored as a region in which internal data are stored.

Figure 10:
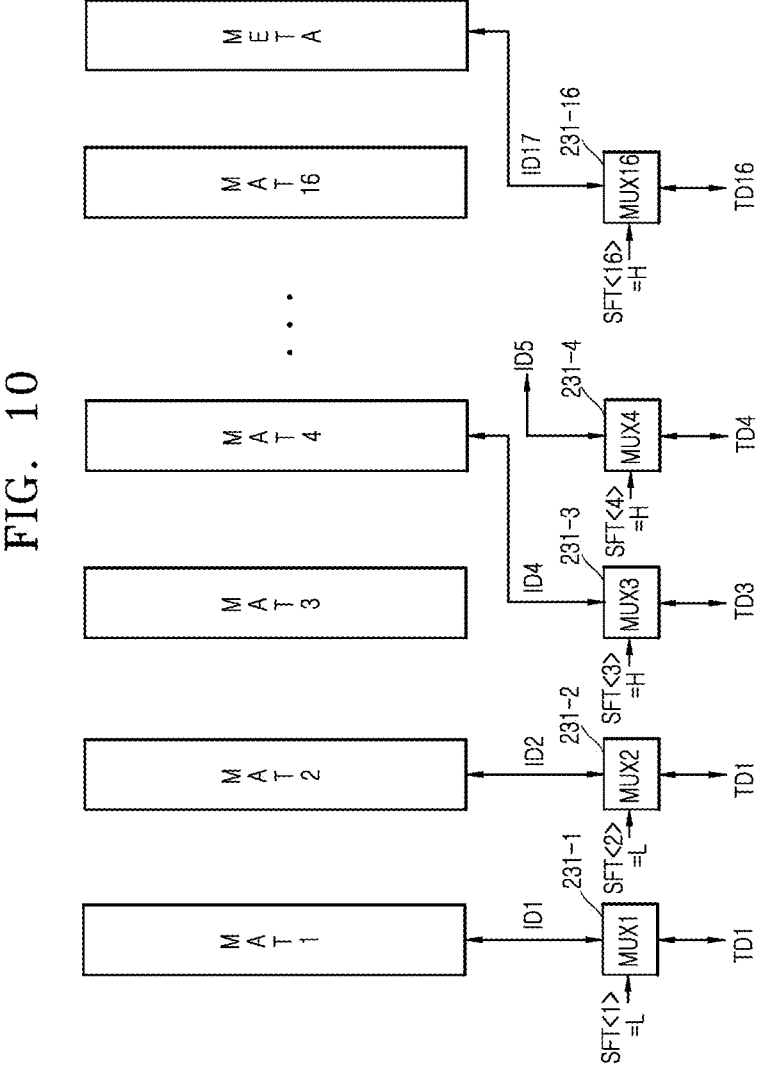
FIG. 10 is a diagram illustrating data input and output for the memory circuit and the data input and output circuit according to an embodiment of the present disclosure.

FIG. 10 is a diagram illustrating data input and output for the memory circuit 220 and the data selection circuit 231 according to an embodiment of the present disclosure. An operation in which the internal data ID1 to ID17 are input and output based on the first to sixteenth bits SFT<1:16> of the shifting signal, where the third to sixteenth bits SFT<3:16> of the shifting signal are enabled in the memory circuit 220 and the data selection circuit 231, according to an embodiment of the present disclosure is described with reference to FIG. 10.

The first multiplexer 231-1 generates the first transfer data TD1 from the first internal data ID1 that are output by the first mat MAT1 when the first bit SFT<1> of the shifting signal is disabled at a logic low level after the start of a read operation during normal operation. The first multiplexer 231-1 generates the first internal data ID1 from the first transfer data TD1 when the first bit SFT<1> of the shifting signal is disabled to a logic low level after the start of a write operation during normal operation and outputs the first internal data ID1 to the first mat MAT1.

The second multiplexer 231-2 generates the second transfer data TD2 from the second internal data ID2 that are output by the second mat MAT2 when the second bit SFT<2> of the shifting signal is disabled at a logic low level after the start of a read operation during normal operation. The second multiplexer 231-2 generates the second internal data ID2 from the second transfer data TD2 when the second bit SFT<2> of the shifting signal is disabled at a logic low level after the start of a write operation during normal operation, and outputs the second internal data ID2 to the second mat MAT2.

The third multiplexer 231-3 generates the third transfer data TD3 from the fourth internal data ID4 that are output by the fourth mat MAT4 when the third bit SFT<3> of the shifting signal is enabled at a logic high level after the start of a read operation during normal operation. The third multiplexer 231-3 generates the fourth internal data ID4 from the third transfer data TD3 when the third bit SFT<3> of the shifting signal is enabled at a logic high level after the start of a write operation during normal operation and outputs the fourth internal data ID4 to the fourth mat MAT4.

The fourth multiplexer 231-4 generates the fourth transfer data TD4 from the fifth internal data ID5 that are output by the fifth mat MAT5 when the fourth bit SFT<4> of the shifting signal is enabled at a logic high level after the start of a read operation during normal operation. The fourth multiplexer 231-4 generates the fifth internal data ID5 from the fourth transfer data TD4 when the fourth bit SFT<4> of the shifting signal is enabled at a logic high level after the start of a write operation during normal operation and outputs the fifth internal data ID5 to the fifth mat MAT5.

Each of the fifth multiplexer 231-5 through the fifteenth multiplexer 231-15 perform the same operation as the multiplexers 231-3 and 231-4, except that the signals that are input to and output from the third and fourth multiplexers 231-3 and 231-4 are different from signals that are input to and output from the multiplexers 231-5 to 231-15.

The sixteenth multiplexer 231-16 generates the sixteenth transfer data TD16 from the seventeenth internal data ID17 that are output by the meta region META when the sixteenth bit SFT<16> of the shifting signal is enabled at a logic high level after the start of a read operation during normal operation. The sixteenth multiplexer 231-16 generates the seventeenth internal data ID17 from the sixteenth transfer data TD16 when the sixteenth bit SFT<16> of the shifting signal is enabled at a logic high level after the start of a write operation during normal operation and outputs the seventeenth internal data ID17 to the meta region META.

As described, the semiconductor system 1 according to an embodiment of the present disclosure uses the meta region META in which meta data are stored as a region in which meta data are stored or a region in which internal data are stored, depending on whether meta mode is enabled. The semiconductor system 1 may reduce the quantity of column lines of a mat in which internal data are stored and may reduce an area by using the meta region META in which meta data are stored as a region in which internal data are stored.

FIG. 11 is a table including data generated during operation of the semiconductor system during normal mode according to an embodiment of the present disclosure. Operation of the semiconductor system during normal mode is described with reference to FIG. 11. An operation including blocking the output of internal data from the sixteenth mat MAT16, the fifteenth mat MAT15, and the second mat MAT2 is described as an example.

An operation including selecting the first column line COL1 to the fourth column line COL4 based on the column signal that is generated by performing a computational operation on the first to fourth bits ADD<1:4> of the address when the output of the internal data of the sixteenth mat MAT16 is blocked is described.

The column signal generation circuit 215 generates the first to fourth bits YI<1:4> of the column signal based on the meta control signal MCTR disabled at a logic low level and the first to sixty-fourth bits IADD<1:64> of the internal address.

The first mat MAT1 to the fifteenth mat MAT15 and the meta region META each output internal data as the column lines COL1 to COL4 are selected based on the first to fourth bits YI<1:4> of the column signal while the sixteenth mat MAT16 blocks (X) the output of the sixteenth internal data ID16.

An operation including selecting the column lines COL5 to COL8 based on the column signal that is generated by performing a computational operation on the first to fourth bits ADD<1:4> of the address when the output of the internal data of the fifteenth mat MAT15 is blocked is described.

The column signal generation circuit 215 generates the fifth to eighth bits YI<5:8> of the column signal based on the meta control signal MCTR disabled at a logic low level and the first to sixty-fourth bits IADD<1:64> of the internal address.

The mats MAT1 to MAT14 and the meta region META each output internal data as the column lines COL5 to COL8 are selected based on the fifth to eighth bits YI<5:8> of the column signal. The sixteenth mat MAT16 outputs the sixteenth internal data ID16 as the column lines COL1 to COL4 are selected based on the first to fourth bits YI<1:4> of the column signal among the first to sixtieth bits YI<1:60> of the column signal while the fifteenth mat MAT15 blocks (X) the output of the fifteenth internal data ID15.

An operation including selecting the column lines COL57 to COL60 based on the column signal that is generated by performing a computational operation on the first to fourth bits ADD<1:4> of the address when the output of the internal data of the second mat MAT2 is blocked is described.

The column signal generation circuit 215 generates the fifty-seventh to sixtieth bits YI<57:60> of the column signal based on the meta control signal MCTR disabled at a logic low level and the first to sixty-fourth bits IADD<1:64> of the internal address.

The first mat MAT1 outputs the first internal data ID1 as the column lines COL57 to COL60 are selected based on the fifty-seventh to sixtieth bits YI<57:60> of the column signal. The mats MAT3 to MAT16 output the internal data ID3 to ID16 as the column lines COL53 to COL56 are selected based on the fifty-third to fifty-sixth bits YI<53:56>. The meta region META outputs the seventeenth internal data ID17 as the column lines COL57 to COL60 are selected based on the fifty-seventh to sixtieth bits YI<57:60> of the column signal while the second mat MAT2 blocks (X) the output of the second internal data ID2.

FIG. 12 is a table including data generated during operation of the semiconductor device during meta mode according to an embodiment of the present disclosure. Operation of the semiconductor device during meta mode is described with reference to FIG. 12. An operation including outputting internal data when the first to fourth bits COL<1:4> of the column signal, the fifth to eighth bits COL<5:8> of the column signal, and the fifty-seventh to sixtieth bits COL<57: 60> of the column signal are generated is described as an example.

An operation including selecting the column lines COL1 to COL4 based on the first to fourth bits COL<1:4> of the column signal is described.

The column signal generation circuit 215 generates the first to fourth bits YI<1:4> of the column signal based on the meta control signal MCTR enabled at a logic high level and the first to sixty-fourth bits IADD<1:64> of the internal address.

The mats MAT1 to MAT16 and the meta region META output the internal data ID1 to ID17 as the column lines COL1 to COL4 are selected based on the first to fourth bits YI<1:4> of the column signal.

An operation including selecting the column lines COL5 to COL8 based on the fifth to eighth bits COL<5:8> of the column signal is described.

The column signal generation circuit 215 generates the fifth to eighth bits YI<5:8> of the column signal based on the meta control signal MCTR enabled at a logic high level and the first to sixty-fourth bits IADD<1:64> of the internal address.

The mats MAT1 to MAT16 and the meta region META output the internal data ID1 to ID17 as the column lines COL5 to COL8 are selected based on the fifth to eighth bits YI<5:8> of the column signal.

An operation including selecting the column lines COL57 to COL60 based on the fifty-seventh to sixtieth bits COL<57:60> of the column signal is described.

The column signal generation circuit 215 generates the fifty-seventh to sixtieth bits YI<57:60> of the column signal based on the meta control signal MCTR enabled at a logic high level and the first to sixty-fourth bits IADD<1:64> of the internal address.

The first to sixteenth mats MAT1 to MAT16 and the meta region META output the first to seventeenth internal data ID1 to ID17 as the fifty-seventh to sixtieth column lines COL57 to COL60 are selected based on the fifty-seventh to sixtieth bits YI<57:60> of the column signal.

Figure 13:
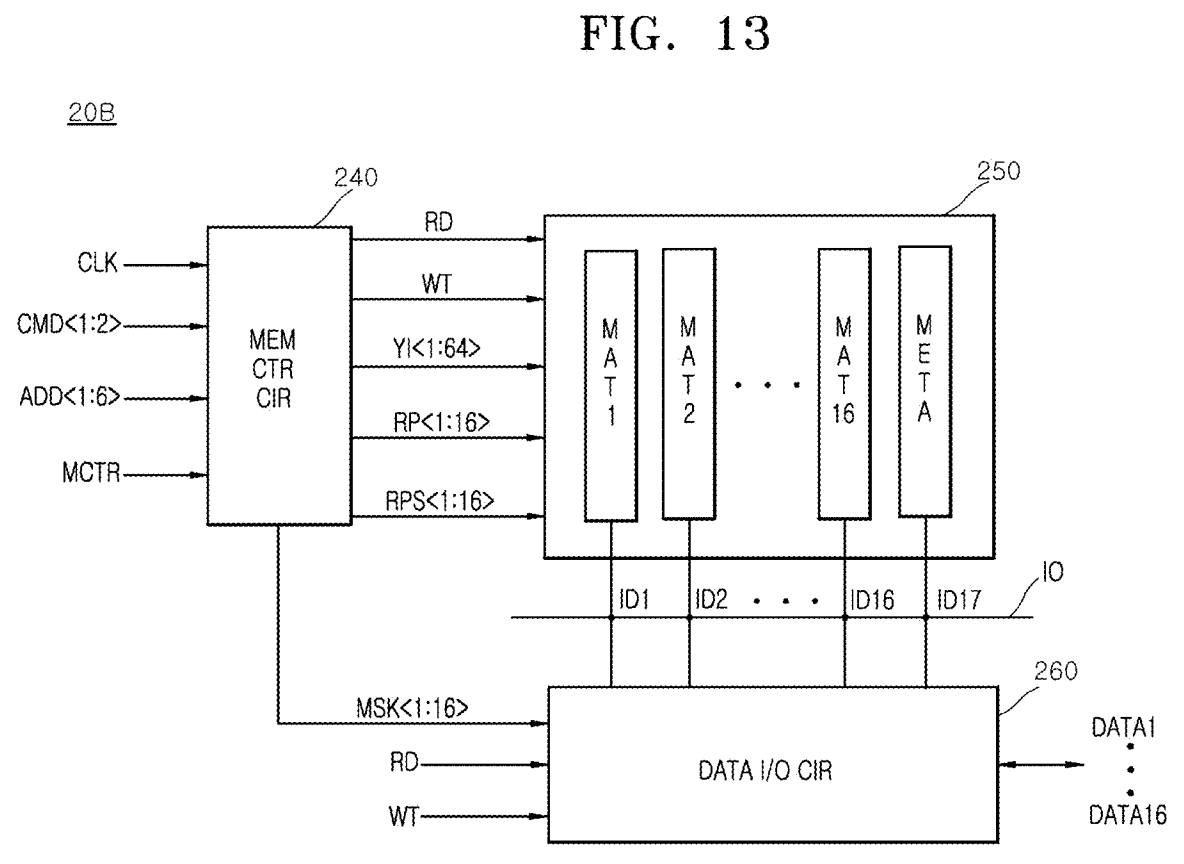

FIG. 13 is a block diagram illustrating an embodiment of the semiconductor device 20 that is included, for example, in the semiconductor system 1 shown in FIG. 1. In an embodiment, a semiconductor device 20B includes a memory control circuit (MEM CTR CIR) 240, a memory circuit 250, and a data input and output circuit (DATA I/O CIR) 260.

The memory control circuit 240 generates a read command RD and a write command WT based on the first and second bits CMD<1:2> of a command in synchronization with a clock signal CLK. The memory control circuit 240 generates the read command RD, for example, when the first and second bits CMD<1:2> of the command input in synchronization with the clock signal CLK have a logic level combination associated with performing a read operation. The memory control circuit 240 generates the write command WT, for example, when the first and second bits CMD<1:2> of the command input in synchronization with the clock signal CLK have a logic level combination associated with performing a write operation. The memory control circuit 240 generates the first to sixty-fourth bits YI<1:64> of a column signal and the first to sixteenth bits MSK<1:16> of a masking signal based on a meta control signal MCTR and the first to sixth bits ADD<1:6> of an address in synchronization with the clock signal CLK. The memory control circuit 240 generates the first to sixtieth bits YI<1:60> of the column signal and the first to sixteenth bits MSK<1:16> of the masking signal by performing a computational operation on the first to sixth bits ADD<1:6> of the address in normal mode based on the meta control signal MCTR. The memory control circuit 240 generates the first to sixty-fourth bits YI<1:64> of the column signal by decoding the first to sixth bits ADD<1:6> of the address during meta mode based on the meta control signal MCTR. The memory control circuit 240 generates the first to sixteenth bits RP<1:16> of a repair signal when the first to sixth bits ADD<1:6> of the address have a logic level combination that selects a column line at a location where a fail occurred, for example. The memory control circuit 240 generates the first to sixteenth bits RPS<1:16> of an operation repair signal when the first to fourth bits ADD<1:4> of the address have a logic level combination that selects a column line at a location where a fail occurred, for example.

In an embodiment, the memory circuit 250 includes first mat MAT1 through sixteenth mats MAT16 and a meta region META.

The first mat MAT1 outputs first internal data ID1 stored in the first mat to an input and output line IO based on the read command RD and the first to sixtieth bits YI<1:60> of the column signal during normal mode. The first mat MAT1 stores the first internal data ID1 from the input and output line IO based on the write command WT and the first to sixtieth bits YI<1:60> of the column signal during normal mode. The first mat MAT1 outputs the first internal data ID1 stored in the first mat to the input and output line IO based on the read command RD and the first to sixtieth bits YI<1:60> of the column signal during meta mode. The first mat MAT1 substitutes a column line in which a fail occurred with a repair column line based on the first repair signal RP<1>. The first mat MAT1 substitutes a column line in which a fail occurred with a repair column line based on the first operation repair signal RPS<1>.

The second mat MAT2 outputs second internal data ID2 stored in the second mat to the input and output line IO, based on the read command RD and the first to sixtieth bits YI<1:60> of the column signal during normal mode. The second mat MAT2 stores the second internal data ID2 loaded onto the input and output line IO, based on the write command WT and the first to sixtieth bits YI<1:60> of the column signal during normal mode. The second mat MAT2 outputs the second internal data ID2 stored in the second mat to the input and output line IO based on the read command RD and the first to sixtieth bits YI<1:60> of the column signal during meta mode. The second mat MAT2 substitutes a column line in which a fail occurred with a repair column line based on the second repair signal RP<2>. The second mat MAT2 substitutes a column line in which a fail occurred with a repair column line based on the second operation repair signal RPS<2>.

Each of the third mat MAT3 through the sixteenth mat MAT16 is implemented with the same circuit as the circuit of the mats MAT1 and MAT2 and performs the same operation as the mats MAT1 and MAT2, except that the signals that are input to and output from each of the mats MAT1 and MAT2 are different form signals that are input to and output from the mats MAT3 to MAT16.

The meta region META outputs seventeenth internal data ID17 stored in the meta region to the input and output line IO based on the read command RD and the first to sixtieth bits YI<1:60> of the column signal during normal mode. The meta region META stores the seventeenth internal data ID17 from the input and output line IO based on the write command WT and the first to sixtieth bits YI<1:60> of the column signal during normal mode. The meta region META outputs the seventeenth internal data ID17 stored in the meta region to the input and output line IO based on the read command RD and the first to sixty-fourth bits YI<1:64> of the column signal during meta mode. The meta region META stores the seventeenth internal data ID17 from the input and output line IO based on the write command WT and the first to sixty-fourth bits YI<1:64> of the column signal during meta mode. The seventeenth internal data that are input and output during normal mode, for example, ID17 in FIG. 2, are common data. The seventeenth internal data ID17 input and output during meta mode are included in a parity signal including error information for the first to sixteenth internal data ID1 to ID16. The seventeenth internal data ID17 that are input and output during meta mode are included in a parity signal, but may be included in a signal including various types of information according to an embodiment.

The memory circuit 250 outputs the first data ID1 to the sixteenth internal data ID16 stored in the mats MAT1 to MAT16, respectively, based on the read command RD and the first to sixtieth bits YI<1:60> of the column signal during normal mode. The memory circuit 250 outputs the seventeenth internal data ID17 stored in the meta region META based on the read command RD and the first to sixtieth bits YI<1:60> of the column signal during normal mode. The memory circuit 250 stores the internal data ID1 to ID16 in the mats MAT1 to MAT16, respectively, based on the write command WT and the first to sixtieth bits YI<1:60> of the column signal during normal mode. The memory circuit 250 stores seventeenth internal data ID17 in the meta region META based on the write command WT and the first to sixtieth bits YI<1:60> of the column signal during normal mode. The memory circuit 250 repairs a column line at a location where a fail occurred based on the first to sixteenth bits RP<1:16> of the repair signal and the first to sixteenth bits RPS<1:16> of the operation repair signal.

The memory circuit 250 outputs the internal data ID1 to ID16 stored in the mats MAT1 to MAT16, based on the read command RD and the first to sixtieth bits YI<1:60> of the column signal during meta mode. The memory circuit 250 outputs the seventeenth internal data ID17 stored in the meta region META based on the read command RD and the first to sixty-fourth bits YI<1:64> of the column signal during meta mode. The memory circuit 250 stores the internal data ID1 to ID16 in the mats MAT1 to MAT16 based on the write command WT and the first to sixty-fourth bits YI<1:64> of the column signal during meta mode. The memory circuit 250 stores the seventeenth internal data ID17 in the meta region META based on the write command WT and the first to sixty-fourth bits YI<1:64> of the column signal during meta mode.

The data input and output circuit 260 blocks one of the internal data ID1 to ID16 based on the read command RD and the first to sixteenth bits MSK<1:16> of the masking signal. The data input and output circuit 260 generates first data DATA1 to sixteenth dataDATA16 from the internal data ID1 to ID16, one of which is blocked and the seventeenth internal data ID17. The data input and output circuit 260 blocks one of the data DATA1 to DATA16 based on the write command WT and the first to sixteenth bits MSK<1:16> of the masking signal and generates the internal data ID1 to ID17 from the data DATA1 to DATA16, one of which is blocked.

FIG. 14 is a block diagram illustrating an embodiment of the memory control circuit 240 that is included, for example, in the semiconductor device 20B shown in FIG. 13. In an embodiment, the memory control circuit 240 includes a command decoder (CMD DEC) 241, an address decoder (ADD DEC) 242, a flag signal generation circuit (HFLAG GEN) 243, a repair control circuit (RP CIT CIR) 244, a column signal generation circuit (YI GEN) 245, and a masking signal generation circuit (MSK GEN) 246.

The command decoder 241 generates the read command RD and the write command WT based on the first and second bits CMD<1:2> of the command in synchronization with the clock signal CLK. The command decoder 241 generates the read command RD, for example, when the first and second bits CMD<1:2> of the command input in synchronization with the clock signal CLK have a logic level combination associated with performing a read operation. The command decoder 241 generates the write command WT, for example, when the first and second bits CMD<1:2> of the command input in synchronization with the clock signal CLK have a logic level combination associated with performing a write operation.

The address decoder 242 generates, in synchronization with the clock signal CLK, the first to sixty-fourth bits IADD<1:64> of an internal address based on the first to sixth bits ADD<1:6> of the address. The address decoder 242 generates, in synchronization with the clock signal CLK, the first to sixty-fourth bits IADD<1:64> of the internal address by decoding the first to sixth bits ADD<1:6> of the address.

The flag signal generation circuit 243 generates the first to sixteenth bits HFLAG<1:16> of a flag signal based on the meta control signal MCTR and the first to fourth bits ADD<1:4> of the address. The flag signal generation circuit 243 generates the first to sixteenth bits HFLAG<1:16> of the flag signal, which are selectively enabled based on a logic level combination of the first to fourth bits ADD<1:4> of the address, during normal mode when the meta control signal MCTR is disabled at a logic low level. The flag signal generation circuit 243 generates the first to sixteenth bits HFLAG<1:16> of the flag signal, each of which is disabled during meta mode when the meta control signal MCTR is disabled at a logic low level.

The flag signal generation circuit 243 generates the first bit HFLAG<1> of the flag signal that is enabled when the first to fourth bits ADD<1:4> of the address have a logic level combination 1111 when the meta control signal MCTR is disabled at a logic low level. The flag signal generation circuit 243 generates the second bit HFLAG<2> of the flag signal that is enabled when the first to fourth bits ADD<1:4> of the address have a logic level combination 1110 when the meta control signal MCTR is disabled at a logic low level. An example in which the first to fourth bits ADD<1:4> of the address have a logic level combination 1111 includes an example in which each of the first to fourth bits ADD<1:4> of the address is at a logic high level. An example in which the first to fourth bits ADD<1:4> of the address have a logic level combination 1110 includes an example in which each of the second to fourth addresses ADD<2:4> is at a logic high level and the first bit ADD<1> of the address is at a logic low level. A logic level combination of the first to fourth bits ADD<1:4> of the address associated with generating each of the third to sixteenth bits HFLAG<3:16> of the flag signal may be derived in a similar manner by those skilled in the art from the logic level combination associated with generating each of the first and second bits HFLAG<1:2> of the flag signal.

The repair control circuit 244 generates the first to sixteenth bits RP<1:16> of the repair signal and the first to sixteenth bits RPS<1:16> of the operation repair signal when the first to sixth bits ADD<1:6> of the address have a logic level combination that selects a column line at a location where a fail occurred, for example. The repair control circuit 244 generates the first to sixteenth bits RP<1:16> of the repair signal, which are enabled when the first to sixth bits ADD<1:6> of the address have the same logic level combination as the first to sixth bits FADD1<1:6> of a fail address. The repair control circuit 244 generates the first to sixteenth bits RPS<1:16> of the operation repair signal that is enabled when the first to fourth bits ADD<1:4> of the address on which a computational operation is performed have the same logic level combination as the first to fourth bits FADD2<1:4> of an operation fail address, for example. The first to sixth bits FADD1<1:6> of the fail address are included in a signal that is generated with a logic level combination for a column line in which a fail occurred. The first to fourth bits FADD2<1:4> of the operation fail address are included in a signal that is generated with a logic level combination for a column line in which a fail occurred. The first to sixth bits FADD1<1:6> of the fail address and the first to fourth bits FADD2<1:4> of the operation fail address may be included in a signal that is generated by a fuse array (not illustrated) that is included within the semiconductor device 20B. The repair control circuit 244 is implemented using the same circuit as the repair control circuit 214 illustrated in FIG. 4 and performs the same operation as the repair control circuit 214.

The column signal generation circuit 245 generates the first to sixty-fourth bits YI<1:64> of the column signal based on the meta control signal MCTR and the first to sixty-fourth bits IADD<1:64> of the internal address. The column signal generation circuit 215 generates the first to sixtieth bits YI<1:60> of the column signal by performing a computational operation on the first to sixty-fourth bits IADD<1:64> of the internal address during normal mode when the meta control signal MCTR is disabled. The column signal generation circuit 245 generates the first to sixty-fourth bits YI<1:64> of the column signal from the first to sixty-fourth bits IADD<1:64> of the internal address during meta mode when the meta control signal MCTR is enabled. The computational operation may be a subtraction operation. The computational operation according to an embodiment of the present disclosure by −4 may be an operation in which a subtraction operation is performed on the first to sixty-fourth bits IADD<1:64> of the internal address. The computational operation according to an embodiment of the present disclosure includes an example in which a subtraction by −4N operation is performed on the first to sixty-fourth bits IADD<1:64> of the internal address. N is an integer greater than 0. According to an embodiment, a computational operation may be an addition operation.

The masking signal generation circuit 246 generates the first to sixteenth bits MSK<1:16> of the masking signal based on the meta control signal MCTR and the first to sixteenth bits HFLAG<1:16> of the flag signal. The masking signal generation circuit 246 generates the first to sixteenth bits MSK<1:16> of the masking signal based on the first to sixteenth bits HFLAG<1:16> of the flag signal during normal mode when the meta control signal MCTR is disabled. The masking signal generation circuit 246 generates the first to sixteenth bits MSK<1:16> of the masking signal, each of which is disabled at a logic low level during meta mode when the meta control signal MCTR is enabled.

For example, the masking signal generation circuit 246 generates the first and second bits MSK<1:2> of the masking signal and the fourth to sixteenth bits MSK<4:16> of the masking signal, which are disabled at a logic low level when the third bit HFLAG<3> of the flag signal is enabled at a logic high level during normal mode, and the third bit MSK<3> of the masking signal that is enabled at a logic high level when the third bit HFLAG<3> of the flag signal is enabled at a logic high level during normal mode. The masking signal generation circuit 246 generates the first to ninth bits MSK<1:9> of the masking signal and the eleventh to sixteenth bits MSK<11:16> of the masking signal, which are disabled at a logic low level when the tenth bit HFLAG<10> of the flag signal is enabled at a logic high level during normal mode, and the tenth bit MSK<10> of the masking signal that is enabled at a logic high level when the tenth bit HFLAG<10> of the flag signal is enabled at a logic high level during normal mode.

Figure 15:
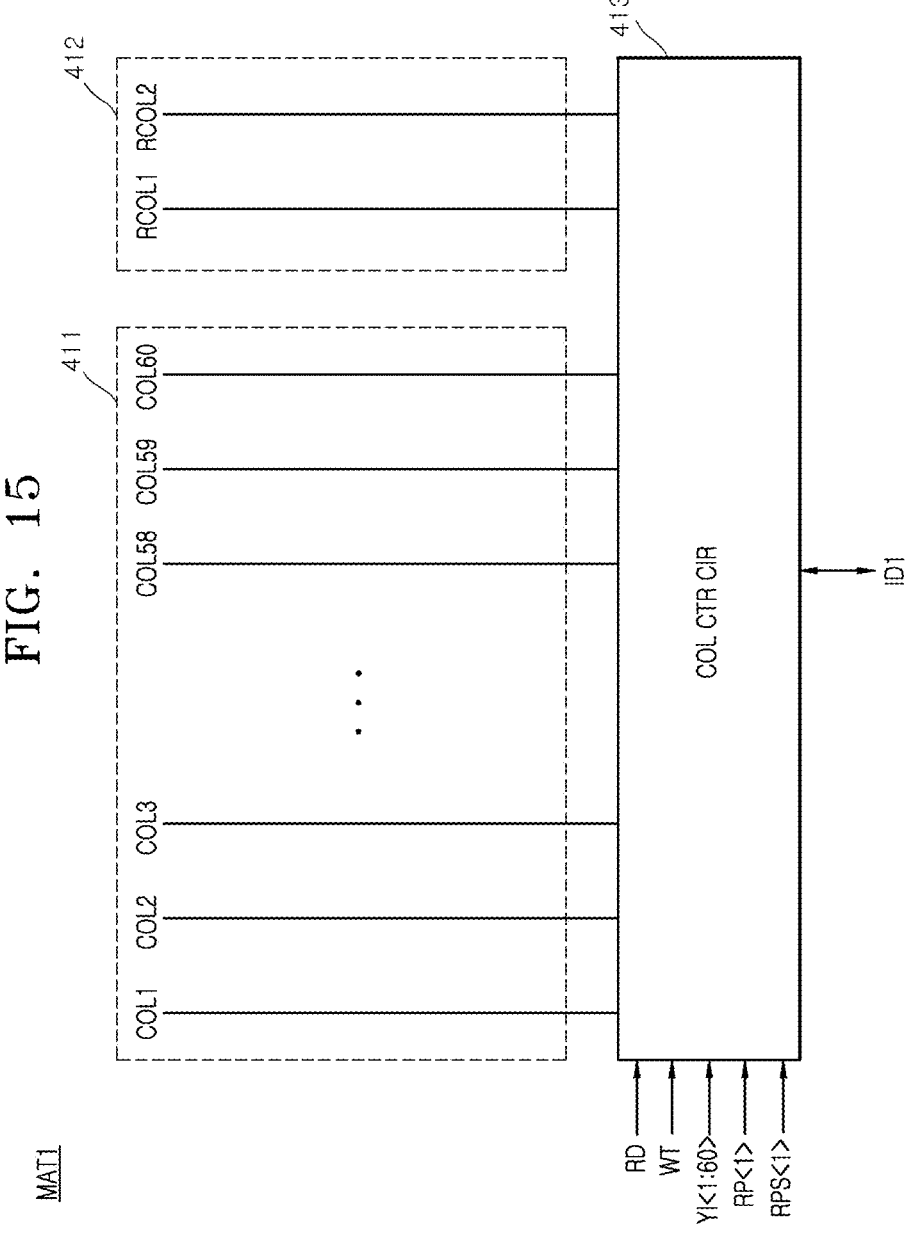
FIG. 15 is a block diagram illustrating an embodiment of a first mat that is included in a memory circuit according to an embodiment of the present disclosure.

FIG. 15 is a block diagram illustrating an embodiment of the first mat MAT1 that is included, for example, in the memory circuit 250 shown in FIG. 13. In an embodiment, the first mat MAT1 includes a memory cell array 411, a repair region 412, and a column control circuit (COL CTR CIR) 413.

In an embodiment, the memory cell array 411 includes column lines COL1 to COL60. A plurality of memory cells (not illustrated) is connected to each of the column lines COL1 to COL60. The plurality of memory cells (not illustrated) that is connected to each of the column lines COL1 to COL60 outputs the first internal data ID1 after the start of a read operation during normal operation. The plurality of memory cells (not illustrated) that is connected to each of the column lines COL1 to COL60 stores the first internal data ID1 after the start of a write operation during normal operation. In an embodiment, the memory cell array 411 includes a first quantity of column lines, such as 60 column lines. The quantity of column lines that are included in the memory cell array 411 may vary according to an embodiment.

In an embodiment, the repair region 412 includes first repair column line RCOL1 and second repair column line RCOL2. A plurality of memory cells (not illustrated) is connected to each of the repair column lines RCOL1 and RCOL2. The first repair column line RCOL1 is a column line substituted for a column line in which a fail occurred among the column lines COL1 to COL60 in which the fail occurred, when the first bit RP<1> of the repair signal is enabled. The second repair column line RCOL2 is a column line substituted for a column line in which a fail occurred, among the column lines COL1 to COL60 in which the fail occurred, when the first bit RPS<1> of the operation repair signal is enabled.

The column control circuit 413 is electrically connected to the column lines COL1 to COL60 and the repair column lines RCOL1 and RCOL2.

The column control circuit 413 outputs the first internal data ID1 stored in the plurality of memory cells, by connecting one of the column lines COL1 to COL60 based on the first to sixtieth bits YI<1:60> of the column signal when the read command RD is enabled. The column control circuit 413 substitutes a column line in which a fail occurred, among the column lines COL1 to COL60, with the first repair column line RCOL1 when the read command RD is enabled and the first bit RP<1> of the repair signal is enabled. The column control circuit 413 is connected to the first repair column line RCOL1 when the read command RD is enabled and outputs the first internal data ID1 stored in the plurality of memory cells. The column control circuit 413 substitutes a column line in which a fail occurred, among the column lines COL1 to COL60, with the second repair column line RCOL2 when the read command RD is enabled and the first bit RPS<1> of the operation repair signal is enabled. The column control circuit 413 is connected to the second repair column line RCOL2 when the read command RD is enabled and outputs the first internal data ID1 stored in the plurality of memory cells.

The column control circuit 413 stores the first internal data ID1 in the plurality of memory cells by connecting one of the first to sixtieth column lines COL1 to COL60 based on the first to sixtieth bits YI<1:60> of the column signal when the write command WT is enabled. The column control circuit 413 substitutes a column line in which a fail occurred, among the column lines COL1 to COL60, with the first repair column line RCOL1 when the write command RD is enabled and the first bit RP<1> of the repair signal is enabled. The column control circuit 413 is connected to the first repair column line RCOL1 when the write command WT is enabled and stores the first internal data ID1 in the plurality of memory cells. The column control circuit 413 substitutes a column line in which a fail occurred, among the column lines COL1 to COL60, with the second repair column line RCOL2 when the write command WT is enabled and the first bit RPS<1> of the operation repair signal is enabled. The column control circuit 413 is connected to the second repair column line RCOL2 when the write command WT is enabled and stores the first internal data ID1 in the plurality of memory cells.

Each of the mats MAT2 to MAT16 is implemented using the same circuit as the first mat MAT1 illustrated in FIG. 15 and performs the same operation as the first mat MAT1, except that signals that are input to and output from the first mat MAT1 are different from signals that are input to and output from the mats MAT2 to MAT16. The meta region META is implemented with the same circuit as the meta region META illustrated in FIG. 6 and performs the same operation as the meta region META.

Figure 16:
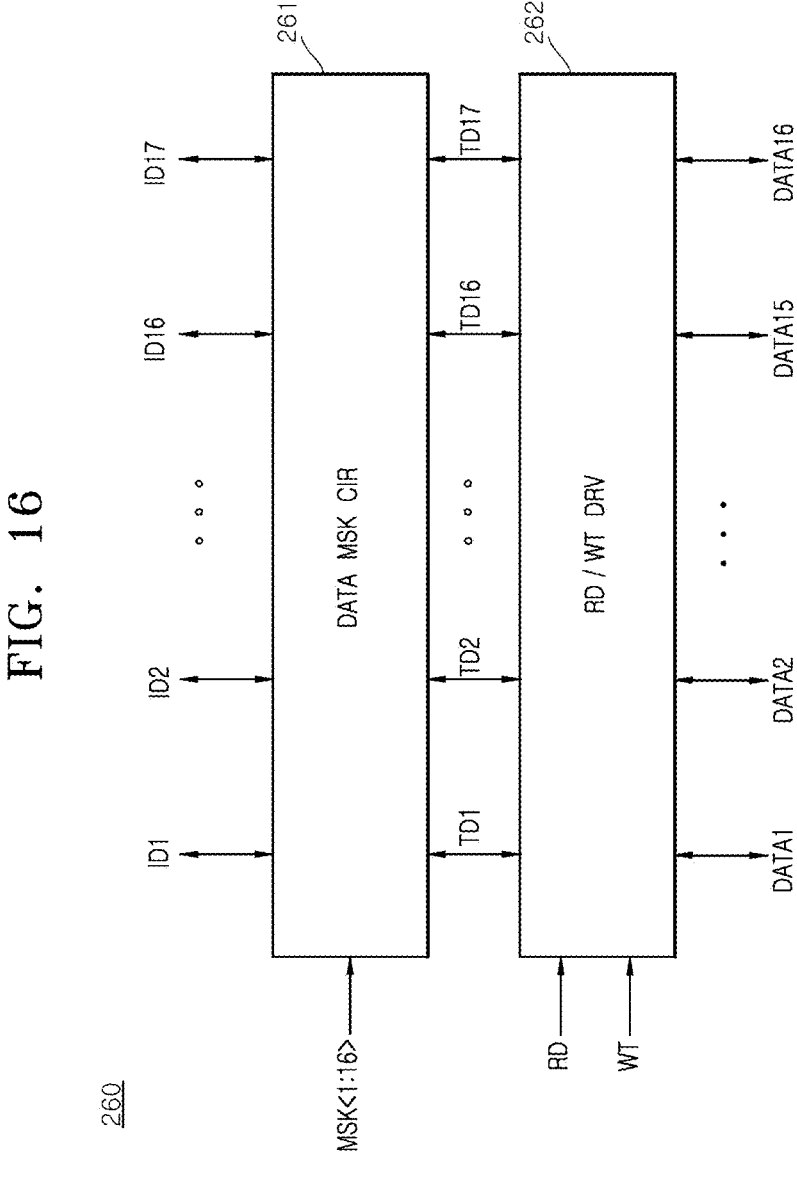
FIG. 16 is a block diagram illustrating an embodiment of a data input and output circuit according to an embodiment of the present disclosure.

FIG. 16 is a block diagram illustrating an embodiment of the data input and output circuit 260 that is included, for example, in the semiconductor device 20B shown in FIG. 13. In an embodiment, the data input and output circuit (DATA MSK CIR) 260 includes a data masking circuit 261 and a read write driving circuit (RD/WT DRV) 262.

The data masking circuit 261 generates first transfer data TD1 through seventeenth transfer data TD17 based on the internal data ID1 to ID17 from the input and output line IO during a read operation. The data masking circuit 261 blocks one of the internal data ID1 to ID16 based on the first to sixteenth bits MSK<1:16> of the masking signal during a read operation. The data masking circuit 261 generates the transfer data TD1 to TD16 based on the internal data ID1 to ID16, one of which is blocked and the seventeenth internal data ID17, during a read operation.

The data masking circuit 261 generates the internal data ID1 to ID17 based on the transfer data TD1 to TD16 during a write operation and outputs the internal data ID1 to ID17 to the input and output line IO. The data masking circuit 261 blocks one of the transfer data TD1 to TD16 based on the first to sixteenth bits MSK<1:16> of the masking signal during a write operation. The data masking circuit 261 generates the internal data ID1 to ID17 based on the transfer data TD1 to TD16 one of which is blocked, during a write operation.

The read write driving circuit 262 generates the first data DATA1 to the sixteenth data DATA16 from the transfer data TD1 to TD16 when the read command RD is enabled. The read write driving circuit 262 outputs the data DATA1 to DATA16 to the controller 10 when the read command RD is enabled.

The read write driving circuit 262 generates the transfer data TD1 to TD16 from the data DATA1 to DATA16 when the write command WT is enabled. The read write driving circuit 262 outputs the transfer data TD1 to TD16 to the data selection circuit 231 when the write command RD is enabled.

Figure 17:
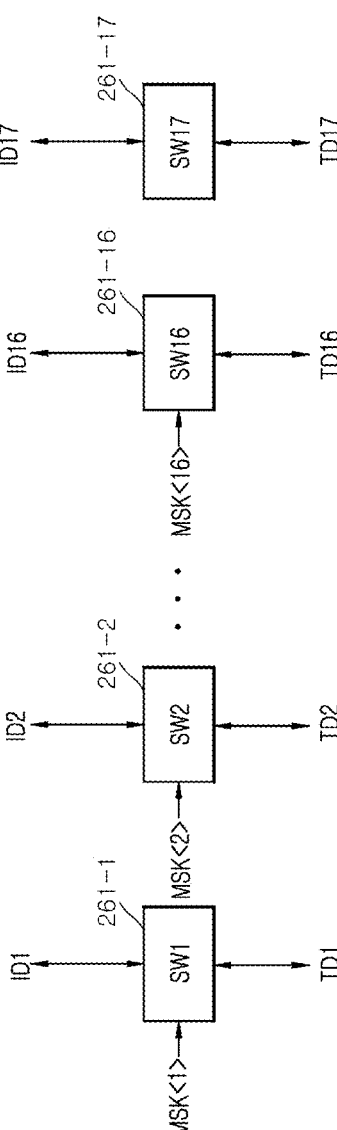
FIG. 17 is a block diagram illustrating an embodiment of a data masking circuit according to an embodiment of the present disclosure.

FIG. 17 is a block diagram illustrating an embodiment of the data masking circuit 261 that is included, for example, in the data input and output circuit 260 shown in FIG. 16. In an embodiment, the data masking circuit 261 includes a first switch circuit (SW1) 261-1 through a seventeenth switch circuit (SW17) 261-17.

The first switch circuit 261-1 generates the first transfer data TD1 from the first internal data ID1 based on the first bit MSK<1> of the masking signal during a read operation. The first switch circuit 261-1 generates the first transfer data TD1 from the first internal data ID1 when the first bit MSK<1> of the masking signal is disabled at a logic low level during a read operation. The first switch circuit 261-1 blocks the input of the first internal data ID1 when the first bit MSK<1> of the masking signal is enabled at a logic high level during a read operation. The first switch circuit 261-1 generates the first internal data ID1 from the first transfer data TD1 based on the first bit MSK<1> of the masking signal during a write operation. The first switch circuit 261-1 generates the first internal data ID1 from the first transfer data TD1 when the first bit MSK<1> of the masking signal is disabled at a logic low level during a write operation. The first switch circuit 261-1 blocks the input of the first transfer data TD1 when the first bit MSK<1> of the masking signal is enabled at a logic high level during a write operation.

The second switch circuit 261-2 generates the second transfer data TD2 from the second internal data ID2 based on the second bit MSK<2> of the masking signal during a read operation. The second switch circuit 261-2 generates the second transfer data TD2 from the second internal data ID2 when the second bit MSK<2> of the masking signal is disabled at a logic low level during a read operation. The second switch circuit 261-2 blocks the input of the second internal data ID2 when the second bit MSK<2> of the masking signal is enabled at a logic high level during a read operation. The second switch circuit 261-2 generates the second internal data ID2 from the second transfer data TD2 based on the second bit MSK<2> of the masking signal during a write operation. The second switch circuit 261-2 generates the second internal data ID2 from the second transfer data TD2 when the second bit MSK<2> of the masking signal is disabled at a logic low level during a write operation. The second switch circuit 261-2 blocks the input of the second transfer data TD2 when the second bit MSK<2> of the masking signal is enabled at a logic high level during a write operation.

Each of the third switch circuits 261-3 through the sixteenth switch circuit 261-16 the same operation the switch circuits 261-1 and 261-2, except that the signals that are input to and output from the switch circuits 261-1 to 261-2 are different from signals that are input to and output from the switch circuits 261-3 to 261-16.

The seventeenth switch circuit 261-17 generates the seventeenth transfer data TD17 from the seventeenth internal data ID17 during a read operation. The seventeenth switch circuit 261-17 generates the seventeenth internal data ID17 from the seventeenth transfer data TD17 during a write operation.

Figure 18:
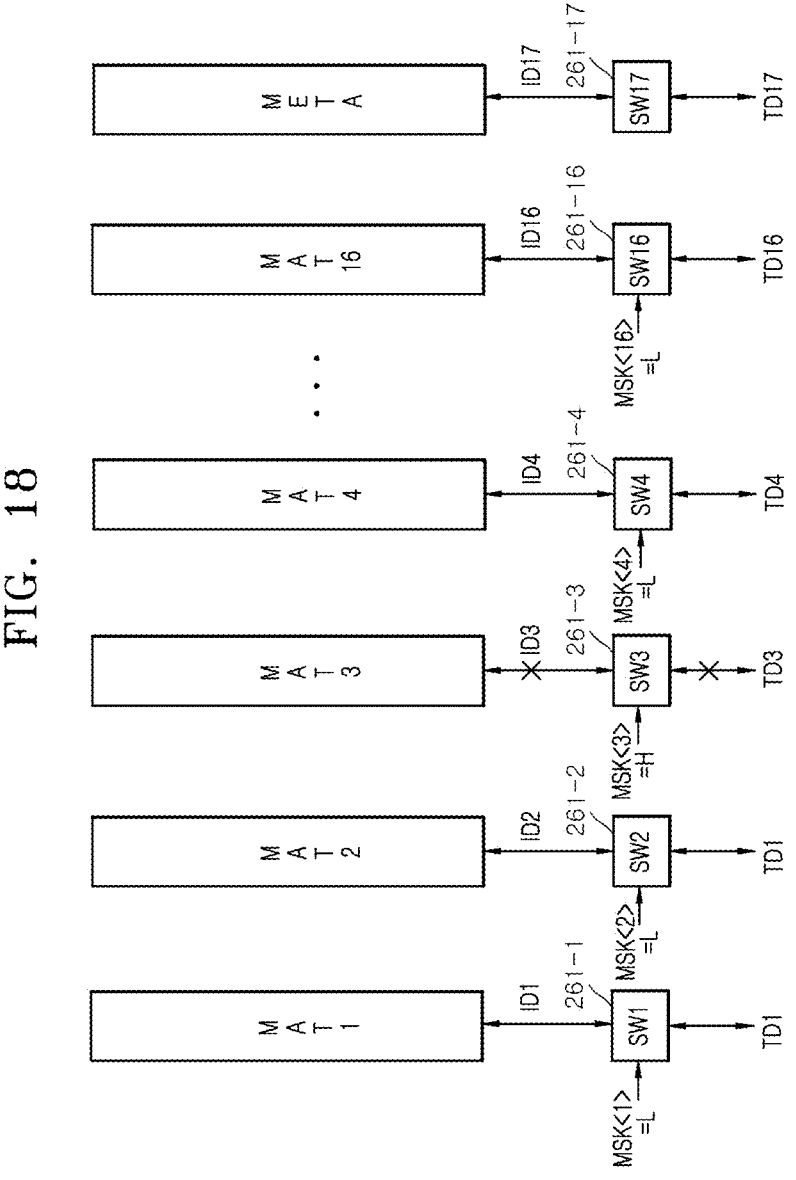
FIG. 18 is a diagram illustrating data input and output for the memory circuit and the data input and output circuit according to an embodiment of the present disclosure.

FIG. 18 is a diagram illustrating data input and output for the memory circuit 250 and the data masking circuit 261 according to an embodiment of the present disclosure. Operations including inputting and outputting, by the memory circuit 250 and the data masking circuit 261, the internal data ID1 to ID17 based on the first to sixteenth bits MSK<1:16> of the masking signal during normal operation according to an embodiment of the present disclosure are described with reference to FIG. 18.

The first switch circuit 261-1 generates the first transfer data TD1 from the first internal data ID1 that are output by the first mat MAT1 when the first bit MSK<1> of the masking signal is disabled at a logic low level after the start of a read operation during normal operation. The first switch circuit 261-1 generates the first internal data ID1 from the first transfer data TD1 when the first bit MSK<1> of the masking signal is disabled at a logic low level after the start of a write operation during normal operation and outputs the first internal data ID1 to the first mat MAT1.

The second switch circuit 261-2 generates the second transfer data TD2 from the second internal data ID2 that are output by the second mat MAT1 when the second bit MSK<2> of the masking signal is disabled at a logic low level after the start of a read operation during normal operation. The second switch circuit 261-2 generates the second internal data ID2 from the second transfer data TD2 when the second bit MSK<2> of the masking signal is disabled at a logic low level after the start of a write operation during normal operation and outputs the second internal data ID2 to the second mat MAT2.

The third switch circuit 261-3 blocks the input of the third internal data ID3 that are output by the third mat MAT3 when the third bit MSK<3> of the masking signal is enabled at a logic high level after the start of a read operation during normal operation. The third switch circuit 261-3 blocks the input of the third transfer data TD3 when the third bit MSK<3> of the masking signal is enabled at a logic high level after the start of a write operation during normal operation.

The fourth switch circuit 261-4 generates the fourth transfer data TD4 from the fourth internal data ID4 that are output by the fourth mat MAT4 when the fourth bit MSK<4> of the masking signal is disabled at a logic low level after the start of a read operation during normal operation. The fourth switch circuit 261-4 generates the fourth internal data ID4 from the fourth transfer data TD4 when the fourth bit MSK<4> of the masking signal is disabled at a logic low level after the start of a write operation during normal operation, and outputs the fourth internal data ID4 to the fourth mat MAT4.

Each of the fifth switch circuit 261-5 through the fifteenth switch circuit 261-15 performs the same operation as the switch circuits 261-1 and 261-2 and the fourth switch circuit 261-4, except that the signals that are input to and output from the switch circuits 261-1, 261-2, and 261-4 are different from signals that are input to and output from the switch circuits 261-5 to 261-15.

The seventeenth switch circuit 261-17 generates the seventeenth transfer data TD17 from the seventeenth internal data ID17 that are output by the meta region META after the start of a read operation during normal operation. The seventeenth switch circuit 261-17 generates the seventeenth internal data ID17 from the seventeenth transfer data TD17 after the start of a write operation during normal operation and outputs the seventeenth internal data ID17 to the meta region META.

As described, the semiconductor system 1 according to an embodiment of the present disclosure uses the meta region META in which meta data are stored as a region in which meta data are stored or a region in which internal data are stored, depending on whether meta mode is enabled. The semiconductor system 1 may reduce the quantity of column lines of a mat in which internal data are stored and may reduce an area by using the meta region META in which meta data are stored as a region in which internal data are stored.

Figure 19:
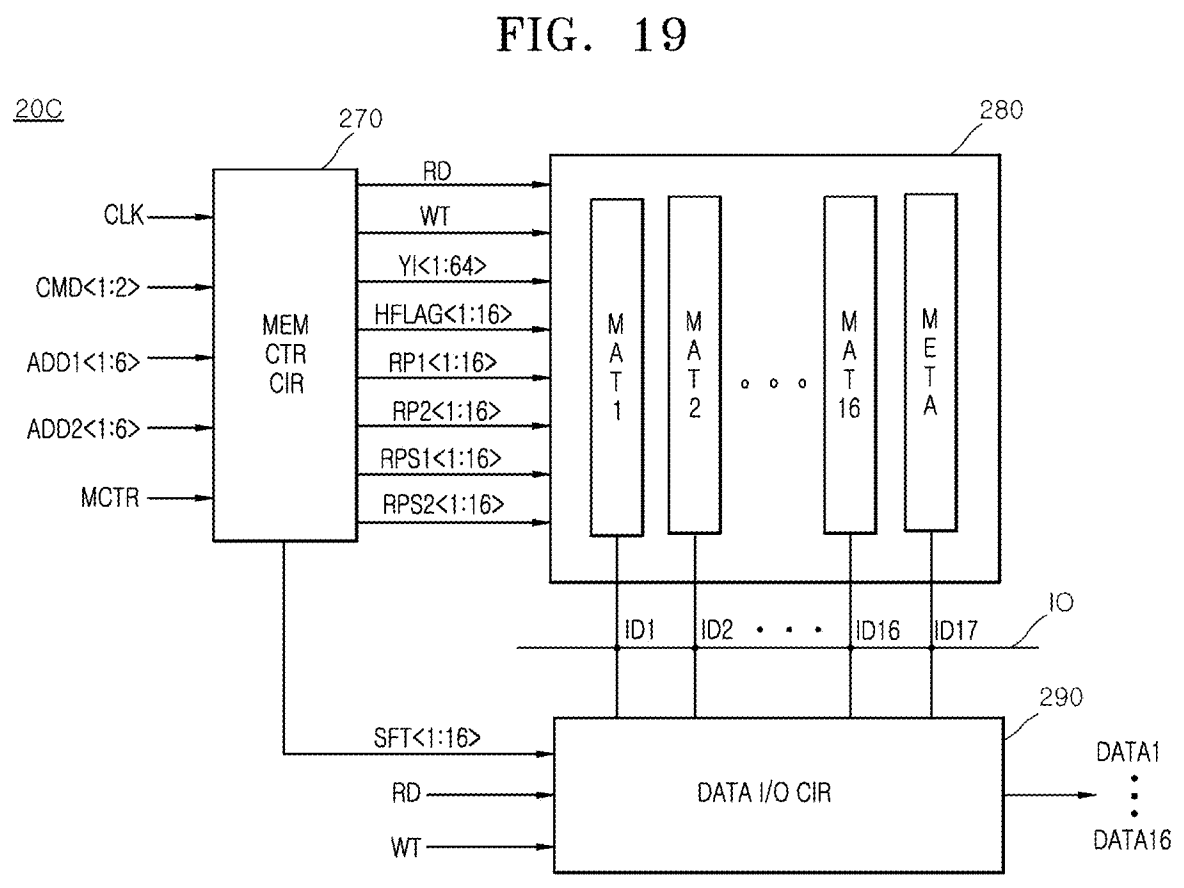

FIG. 19 is a block diagram illustrating an embodiment of the semiconductor device 20 that is included, for example, in the semiconductor system 1 as shown in FIG. 1. In an embodiment, a semiconductor device 20C includes a memory control circuit (MEM CTR CIR) 270, a memory circuit 280, and a data input and output circuit (DATA I/O CIR) 290.

The memory control circuit 270 generates a read command RD and a write command WT based on the first and second bits CMD<1:2> of a command in synchronization with a clock signal CLK. The memory control circuit 270 generates the read command RD when the first and second bits CMD<1:2> of the command input in synchronization with the clock signal CLK have a logic level combination associated with performing a read operation. The memory control circuit 270 generates the write command WT when the first and second bits CMD<1:2> of the command input in synchronization with the clock signal CLK have a logic level combination associated with performing a write operation.

The memory control circuit 270 generates, in synchronization with the clock signal CLK, the first to sixty-fourth bits YI<1:64> of a column signal, the first to sixteenth bits HFLAG<1:16> of a flag signal, and the first to sixteenth bits SFT<1:16> of a shifting signal based on a meta control signal MCTR and the first to sixth bits ADD1<1:6> of a first address. The memory control circuit 270 generates, in synchronization with the clock signal CLK, the first to sixty-fourth bits YI<1:64> of the column signal, the first to sixteenth bits HFLAG<1:16> of the flag signal, and the first to sixteenth bits SFT<1:16> of the shifting signal, based on the meta control signal MCTR and the first to sixth bits ADD2<1:6> of a second address. The memory control circuit 270 generates the first to sixtieth bits YI<1:60> of the column signal, the first to sixteenth bits HFLAG<1:16> of the flag signal, and the first to sixteenth bits SFT<1:16> of the shifting signal by performing a computational operation on the first to sixth bits ADD1<1:6> of the first address during normal mode based on the meta control signal MCTR. The memory control circuit 270 generates the first to sixtieth bits YI<1:60> of the column signal, the first to sixteenth bits HFLAG<1:16> of the flag signal, and the first to sixteenth bits SFT<1:16> of the shifting signal by performing a computational operation on the first to sixth bits ADD2<1:6> of the second address during normal mode based on the meta control signal MCTR. The memory control circuit 270 generates the first to sixteenth column signal YI<1:64> by decoding the first to sixth bits ADD1<1:6> of the first address during meta mode based on the meta control signal MCTR. The memory control circuit 270 generates the first to sixteenth column signal YI<1:64> by decoding the first to sixth bits ADD2<1:6> of the second address during meta mode based on the meta control signal MCTR. The memory control circuit 270 generates the first to sixteenth bits RP1<1:16> of a first repair signal when the first to sixth bits ADD1<1:6> of the first address have a logic level combination that selects a column line at a location where a fail occurred, for example. The memory control circuit 270 generates the first to sixteenth bits RPS1<1:16> of a first operation repair signal when the first to fourth bits ADD1<1:4> of the first address have a logic level combination that selects a column line at a location where a fail occurred, for example. The memory control circuit 270 generates the first to sixteenth bits RP2<1:16> of a second repair signal when the first to sixth bits ADD2<1:6> of the second address have a logic level combination that selects a column line at a location where a fail occurred, for example. The memory control circuit 270 generates the first to sixteenth bits RPS2<1:16> of a second operation repair signal when the first to fourth bits ADD2<1:4> of the second address have a logic level combination that selects a column line at a location where a fail occurred, for example.

In an embodiment, the memory circuit 280 includes first mat MAT1 through sixteenth mat MAT16 and a meta region META.

The first mat MAT1 outputs first internal data ID1 stored in the first mat to an input and output line IO based on the read command RD and the first to sixtieth bits YI<1:60> of the column signal during normal mode. The first mat MAT1 blocks the output of the first internal data ID1 stored in the first mat based on the first bit HFLAG<1> of the flag signal during normal mode. The first mat MAT1 stores the first internal data ID1 from the input and output line IO based on the write command WT and the first to sixtieth bits YI<1:60> of the column signal during normal mode. The first mat MAT1 outputs the first internal data ID1 stored in the first mat, to the input and output line IO, based on the read command RD and the first to sixtieth bits YI<1:60> of the column signal in meta mode. The first mat MAT1 substitutes a column line in which a fail occurred with a repair column line based on the first bit RP1<1> of the first repair signal. The first mat MAT1 substitutes a column line in which a fail occurred with a repair column line based on the first bit RPS1<1> of the first operation repair signal. The first mat MAT1 substitutes a column line in which a fail occurred with a repair column line based on the first bit RP2<1> of the second repair signal. The first mat MAT1 substitutes a column line in which a fail occurred with a repair column line based on the first bit RPS2<1> of the second operation repair signal.

The second mat MAT2 outputs second internal data ID2 stored in the second mat, to the input and output line IO, based on the read command RD and the first to sixtieth bits YI<1:60> of the column signal during normal mode. The second mat MAT2 blocks the output of the second internal data ID2 stored in the second mat, based on the second bit HFLAG<2> of the flag signal during normal mode. The second mat MAT2 stores the second internal data ID2 from the input and output line IO, based on the write command WT and the first to sixtieth bits YI<1:60> of the column signal during normal mode. The second mat MAT2 outputs the second internal data ID2 stored in the second mat, to the input and output line IO, based on the read command RD and the first to sixtieth bits YI<1:60> of the column signal during meta mode. The second mat MAT2 substitutes a column line in which a fail occurred with a repair column line based on the second bit RP1<2> of the first repair signal. The second mat MAT2 substitutes a column line in which a fail occurred with a repair column line based on the second bit RPS1<2> of the first operation repair signal. The second mat MAT2 substitutes a column line in which a fail occurred with a repair column line based on the second bit RP2<2> of the second repair signal. The second mat MAT2 substitutes a column line in which a fail occurred with a repair column line based on the second bit RPS2<2> of the second operation repair signal.

Each of the third mat MAT3 through the sixteenth mat MAT16 is implemented using the same circuit as the circuit of the mats MAT1 and MAT2 and performs the same operation as the mats MAT1 and MAT2, except that the signals that are input to and output from the mats MAT1 and MAT2 are different from signals that are input to and output from the mats MAT3 to MAT16.

The meta region META outputs seventeenth internal data ID17 stored in the meta region, to the input and output line IO, based on the read command RD and the first to sixtieth bits YI<1:60> of the column signal during normal mode. The meta region META stores the seventeenth internal data ID17 from the input and output line IO based on the write command WT and the first to sixtieth bits YI<1:60> of the column signal during normal mode. The meta region META outputs the seventeenth internal data ID17 stored in the meta region, to the input and output line IO, based on the read command RD and the first to sixty-fourth bits YI<1:64> of the column signal during meta mode. The meta region META stores the seventeenth internal data ID17 from the input and output line IO, based on the write command WT and the first to sixty-fourth bits YI<1:64> of the column signal during meta mode. The seventeenth internal data that are input and output during normal mode, for example, ID17 in FIG. 2, are common data. The seventeenth internal data ID17 input and output during meta mode are included in a parity signal including error information for the first to sixteenth internal data ID1 to ID16. The seventeenth internal data ID17 that are input and output during meta mode are included in the parity signal, but may be included in a signal including various types of information according to an embodiment.

The memory circuit 280 outputs the internal data ID1 to ID16 stored in the mats MAT1 to MAT16 based on the read command RD and the first to sixtieth bits YI<1:60> of the column signal during normal mode. The memory circuit 280 outputs the seventeenth internal data ID17 stored in the meta region META based on the read command RD and the first to sixtieth bits YI<1:60> of the column signal during normal mode. The memory circuit 280 stores the internal data ID1 to ID16 in the mats MAT1 to MAT16 based on the write command WT and the first to sixtieth bits YI<1:60> of the column signal during normal mode. The memory circuit 280 stores the seventeenth internal data ID17 in the meta region META based on the write command WT and the first to sixtieth bits YI<1:60> of the column signal during normal mode. The memory circuit 280 blocks the output of one of the internal data ID1 to ID16 stored in the mats MAT1 to MAT16 based on the first to sixteenth bits HFLAG<1:16> of the flag signal during normal mode. The memory circuit 280 repairs a column line at a location where a fail occurred based on the first to sixteenth bits RP1<1:16> of the first repair signal and the first to sixteenth bits RPS1<1:16> of the first operation repair signal. The memory circuit 280 repairs a column line at a location where a fail occurred based on the first to sixteenth bits RP2<1:16> of the second repair signal and the first to sixteenth bits RPS2<1:16> of the second operation repair signal.

The memory circuit 280 outputs the internal data ID1 to ID16 stored in the mats MAT1 to MAT16 based on the read command RD and the first to sixtieth bits YI<1:60> of the column signal during meta mode. The memory circuit 280 outputs the seventeenth internal data ID17 stored in the meta region META based on the read command RD and the first to sixty-fourth bits YI<1:64> of the column signal during meta mode. The memory circuit 280 stores the internal data ID1 to ID16 in the mats MAT1 to MAT16 based on the write command WT and the first to sixty-fourth bits YI<1:64> of the column signal during meta mode. The memory circuit 280 stores the seventeenth internal data ID17 in the meta region META based on the write command WT and the first to sixty-fourth bits YI<1:64> of the column signal during meta mode.

The data input and output circuit 290 shifts the internal data ID1 to ID16 based on the read command RD and the first to sixteenth bits SFT<1:16> of the shifting signal and generates the first data DATA1 through the sixteenth data DATA16 from the internal data ID1 to ID16 that are shifted and the seventeenth internal data ID17. The data input and output circuit 290 shifts the data DATA1 to DATA16 based on the write command WT and the first to sixteenth bits SFT<1:16> of the shifting signal and generates the internal data ID1 to ID17 from the data DATA1 to DATA16 that are shifted. The data input and output circuit 290 is implemented using the same circuit as the data input and output circuit 230 illustrated in FIG. 7 and performs the same operation as the data input and output circuit 230.

FIG. 20 is a block diagram illustrating an embodiment of the memory control circuit 270 that is included, for example, in the semiconductor device 20C shown in FIG. 19. In an embodiment, the memory control circuit 270 includes a command decoder (CMD DEC) 271, an address decoder (ADD DEC) 272, a flag signal generation circuit (HFLAG GEN) 273, a repair control circuit (RP CTR CIR) 274, a column signal generation circuit (YI GEN) 275, and a shifting signal generation circuit (SFT GEN) 276.

The command decoder 271 generates the read command RD and the write command WT based on the first and second bits CMD<1:2> of the command in synchronization with the clock signal CLK. The command decoder 271 generates the read command RD when the first and second bits CMD<1:2> of the command input in synchronization with the clock signal CLK have a logic level combination associated with performing a read operation. The command decoder 271 generates the write command WT when the first and second bits CMD<1:2> of the command input in synchronization with the clock signal CLK have a logic level combination associated with performing a write operation.

The address decoder 272 generates the first to sixty-fourth bits IADD<1:64> of an internal address based on the first to sixth bits ADD1<1:6> of the first address in synchronization with the clock signal CLK. The address decoder 272 generates, in synchronization with the clock signal CLK, the first to sixty-fourth bits IADD<1:64> of the internal address by decoding the first to sixth bits ADD1<1:6> of the first address. The address decoder 272 generates, in synchronization with the clock signal CLK, the first to sixty-fourth bits IADD<1:64> of the internal address based on the first to sixth bits ADD2<1:6> of the second address. The address decoder 272 generates, in synchronization with the clock signal CLK, the first to sixty-fourth bits IADD<1:64> of the internal address by decoding the first to sixth bits ADD2<1:6> of the second address.

The flag signal generation circuit 273 generates the first to sixteenth bits HFLAG<1:16> of the flag signal based on the meta control signal MCTR and the first to fourth bits ADD1<1:4> of the first address. The flag signal generation circuit 273 generates the first to sixteenth bits HFLAG<1:16> of the flag signal, which are selectively enabled based on a logic level combination of the first to fourth bits ADD1<1:4> of the first address, during normal mode when the meta control signal MCTR is disabled at a logic low level. The flag signal generation circuit 273 generates the first to sixteenth bits HFLAG<1:16> of the flag signal based on the meta control signal MCTR and the first to fourth bits ADD2<1:4> of the second address. The flag signal generation circuit 273 generates the first to sixteenth bits HFLAG<1:16> of the flag signal, which are selectively enabled based on a logic level combination of the first to fourth bits ADD2<1:4> of the second address, during normal mode when the meta control signal MCTR is disabled at a logic low level. The flag signal generation circuit 273 generates the first to sixteenth bits HFLAG<1:16> of the flag signal, each of which is disabled, during meta mode when the meta control signal MCTR is disabled at a logic low level. The flag signal generation circuit 273 generates the first bit HFLAG<1> of the flag signal that is enabled when the first the first to fourth bits ADD<1:4> of the address have a logic level combination 1111 when the meta control signal MCTR is disabled at a logic low level. The flag signal generation circuit 273 generates the second bit HFLAG<2> of the flag signal that is enabled when the first to fourth bits ADD1<1:4> of the first address have a logic level combination 1110 when the meta control signal MCTR is disabled at a logic low level. An example in which the first to fourth bits ADD1<1:4> of the first address have the logic level combination 1111 includes an example in which each of the first to fourth bits ADD1<1:4> of the first address is at a logic high level. An example in which the first to fourth bits ADD1<1:4> of the first address have the logic level combination 1110 includes an example in which each of the second to fourth bits ADD<2:4> of the address is at a logic high level and the first bit ADD1<1> of the first address is at a logic low level. A logic level combination of the first to fourth bits ADD1<1:4> of the first address associated with generating each of the third to sixteenth bits HFLAG<3:16> of the flag signal may be derived in a similar manner by those skilled in the art from the logic level combination associated with generating each of the first and second bits HFLAG<1:2> of the flag signal.

The repair control circuit 274 generates the first to sixteenth bits RP1<1:16> of the first repair signal and the first to sixteenth bits RPS1<1:16> of the first operation repair signal when the first to sixth bits ADD1<1:6> of the first address have a logic level combination that selects a column line at a location where a fail occurred, for example. The repair control circuit 274 generates the first to sixteenth bits RP1<1:16> of the first repair signal, which are enabled when the first to sixth bits ADD1<1:6> of the first address have the same logic level combination as the first to sixth bits FADD1<1:6> of a first fail address. The repair control circuit 274 generates the first to sixteenth bits RPS1<1:16> of the first operation repair signal, which are enabled when the first to fourth bits ADD1<1:4> of the first address on which a computational operation was performed have the same logic level combination as the first to fourth bits FADD3<1:4> of a first operation fail address. The first to sixth bits FADD1<1:6> of the first fail address are included in a signal that is generated with a logic level combination for a column line in which a fail occurred. The first to fourth bits FADD3<1:4> of the first operation fail address are included in a signal that is generated to have a logic level combination for a column line in which a fail occurred. The first to sixth bits FADD1<1:6> of the first fail address and the first to fourth bits FADD3<1:4> of the first operation fail address may be included in a signal that is generated by a fuse array (not illustrated) that is included within the semiconductor device 20C.

The repair control circuit 274 generates the first to sixteenth bits RP2<1:16> of the second repair signal and the first to sixteenth bits RPS2<1:16> of the second operation repair signal when the first to sixth bits ADD2<1:6> of the second address have a logic level combination that selects a column line at a location where a fail occurred, for example. The repair control circuit 274 generates the first to sixteenth bits RP2<1:16> of the second repair signal, which are enabled when the first to sixth bits ADD2<1:6> of the second address have the same logic level combination as the first to sixth bits FADD2<1:6> of a second fail address. The repair control circuit 274 generates the first to sixteenth bits RPS2<1:16> of the second operation repair signal, which are enabled when the first to fourth bits ADD2<1:4> of the second address on which a computational operation is performed have the same logic level combination as the first to fourth bits FADD4<1:4> of a second operation fail address. The first to sixth bits FADD2<1:6> of the second fail address are included in a signal that is generated with a logic level combination for a column line in which a fail occurred. The first to fourth bits FADD4<1:4> of the second operation fail address are included in a signal that is generated with a logic level combination for a column line in which a fail occurred. The first to sixth bits FADD2<1:6> of the second fail address and the first to fourth bits FADD4<1:4> of the second operation fail address may be included in a signal that is generated by the fuse array (not illustrated) that is included within the semiconductor device 20C.

The column signal generation circuit 275 generates the first to sixty-fourth bits YI<1:64> of the column signal based on the meta control signal MCTR and the first to sixty-fourth bits IADD<1:64> of the internal address. The column signal generation circuit 275 generates the first to sixtieth bits YI<1:60> of the column signal by performing a computational operation on the first to sixty-fourth bits IADD<1:64> of the internal address during normal mode when the meta control signal MCTR is disabled. The column signal generation circuit 275 generates the first to sixty-fourth bits YI<1:64> of the column signal from the first to sixty-fourth bits IADD<1:64> of the internal address during meta mode when the meta control signal MCTR is enabled. The computational operation may be a subtraction operation. The computational operation according to an embodiment of the present disclosure includes an example in which a subtraction by −4 operation is performed on the first to sixty-fourth bits IADD<1:64> of the internal address. In an embodiment, the computational operation is an operation including performing subtracting by −4N on the first to sixty-fourth bits IADD<1:64> of the internal address. N is an integer greater than 0. According to an embodiment, a computational operation includes an addition operation.

The shifting signal generation circuit 276 generates the first to sixteenth bits SFT<1:16> of the shifting signal based on the meta control signal MCTR and the first to sixteenth bits HFLAG<1:16> of the flag signal. The shifting signal generation circuit 276 generates the first to sixteenth bits SFT<1:16> of the shifting signal based on the first to sixteenth bits HFLAG<1:16> of the flag signal during normal mode when the meta control signal MCTR is disabled. The shifting signal generation circuit 276 generates the first to sixteenth bits SFT<1:16> of the shifting signal, each of which is disabled at a logic low level, during meta mode when the meta control signal MCTR is enabled.

For example, the shifting signal generation circuit 276 generates the first and second bits SFT<1:2> of the shifting signal, which are disabled at a logic low level, and the third to sixteenth bits SFT<3:16> of the shifting signal, which are enabled at a logic high level, when the third bit HFLAG<3> of the flag signal is enabled at a logic high level during normal mode. The shifting signal generation circuit 276 generates the first to ninth bits SFT<1:9> of the shifting signal, which are disabled at a logic low level, and the tenth to sixteenth bits SFT<10:16> of the shifting signal, which are enabled at a logic high level, when the tenth bit HFLAG<10> of the flag signal is enabled at a logic high level during normal mode.

Figure 21:
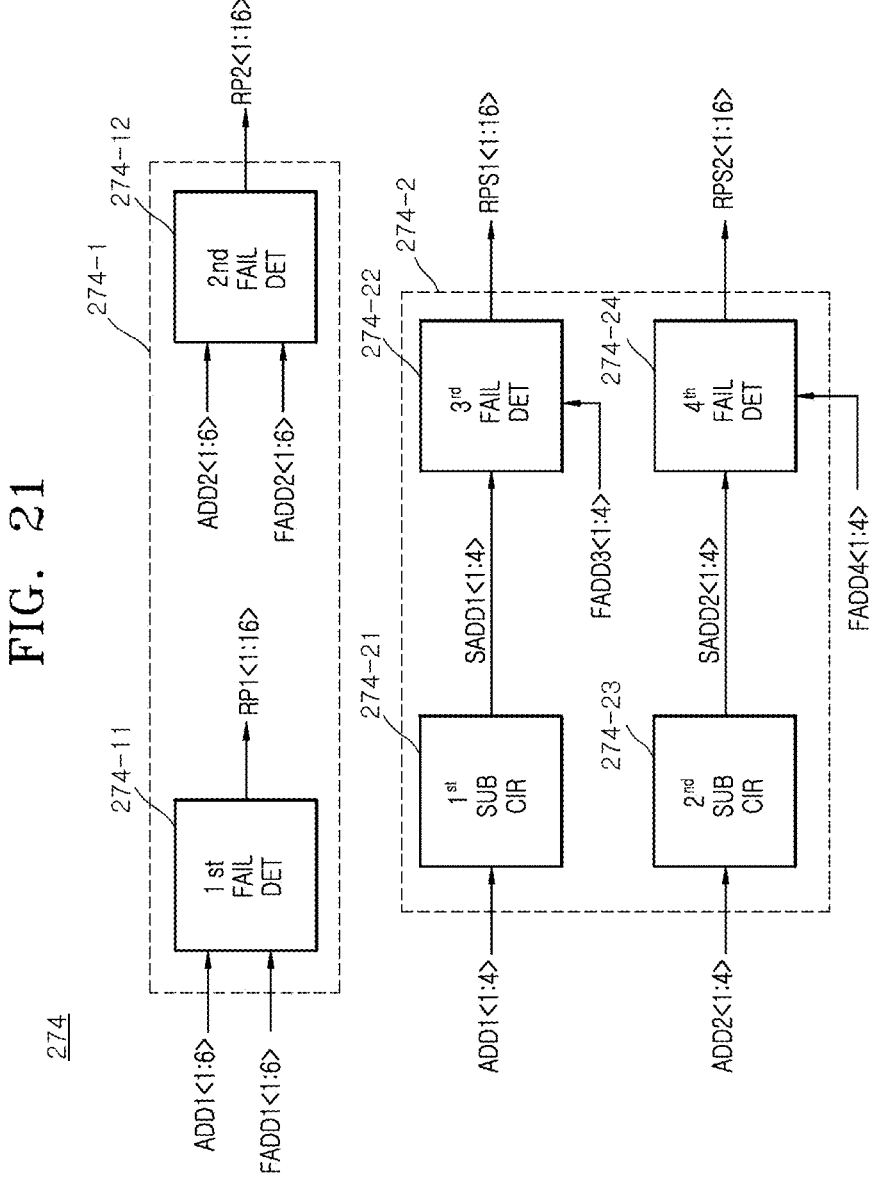
FIG. 21 is a block diagram illustrating an embodiment of a repair control circuit according to an embodiment of the present disclosure.

FIG. 21 is a block diagram illustrating an embodiment of the repair control circuit 274 that is included, for example, in the memory control circuit 270 shown in FIG. 20. In an embodiment, the repair control circuit 274 includes a repair signal generation circuit 274-1 and an operation repair signal generation circuit 274-2.

In an embodiment, the repair signal generation circuit 274-1 includes a first fail detection circuit ($1^{st}$ FAIL DET) 274-11 and a second fail detection circuit ($2^{nd}$ FAIL DET) 274-12.

The first fail detection circuit 274-11 generates the first to sixteenth bits RP1<1:16> of the first repair signal by comparing the first to sixth bits ADD1<1:6> of the first address and the first to sixth bits FADD1<1:6> of the first fail address. The first fail detection circuit 274-11 generates the first to sixteenth bits RP1<1:16> of the first repair signal, which are enabled when the first to sixth bits ADD1<1:6> of the first address have the same logic level combination as the first to sixth bits FADD1<1:6> of the first fail address.

The second fail detection circuit 274-12 generates the first to sixteenth bits RP2<1:16> of the second repair signal by comparing the first to sixth bits ADD2<1:6> of the second address and the first to sixth bits FADD2<1:6> of the second fail address. The second fail detection circuit 274-12 generates the first to sixteenth bits RP2<1:16> of the second repair signal, which are enabled when the first to sixth bits ADD2<1:6> of the second address have the same logic level combination as the first to sixth bits FADD2<1:6> of the second fail address.

In an embodiment, the operation repair signal generation circuit 274-2 includes a first subtraction circuit (1st SUB CIR) 274-21, a third fail detection circuit ($3^{rd}$ FAIL DET) 274-22, a second subtraction circuit ($2^{nd}$ SUB CIR) 274-23, and a fourth fail detection circuit ($4^{th}$ FAIL DET) 274-24.

The first subtraction circuit 274-21 generates the first to fourth bits SADD1<1:4> of a first subtraction address by performing a computational operation on the first to fourth bits ADD1<1:4> of the first address. The first subtraction circuit 274-21 generates the first to fourth bits SADD1<1:4> of the first subtraction address by performing a subtraction by −4 operation on the first to fourth bits ADD1<1:4> of the first address.

The third fail detection circuit 274-22 generates the first to sixteenth bits RPS1<1:16> of the first operation repair signal by comparing the first to fourth bits SADD1<1:4> of the first subtraction address and the first to fourth bits FADD3<1:4> of the first operation fail address. The third fail detection circuit 274-22 generates the first to sixteenth bits RPS1<1:16> of the first operation repair signal, which are enabled when the first to fourth bits SADD1<1:4> of the first subtraction address have the same logic level combination as the first to fourth bits FADD3<1:4> of the first operation fail address.

The second subtraction circuit 274-23 generates the first to fourth bits SADD2<1:4> of a second subtraction address by performing a computational operation on the first to fourth bits ADD2<1:4> of the second address. The second subtraction circuit 274-23 generates the first to fourth bits SADD2<1:4> of the second subtraction address by performing a subtraction by −4 operation on the first to fourth bits ADD2<1:4> of the second address.

The fourth fail detection circuit 274-24 generates the first to sixteenth bits RPS2<1:16> of the second operation repair signal by comparing the first to fourth bits SADD2<1:4> of the second subtraction address and the first to fourth bits FADD4<1:4> of the second operation fail address. The fourth fail detection circuit 274-24 generates the first to sixteenth bits RPS2<1:16> of the second operation repair signal, which are enabled when the first to fourth bits SADD2<1:4> of the second subtraction address have the same logic level combination as the first to fourth bits FADD4<1:4> of the second operation fail address.

Figure 22:
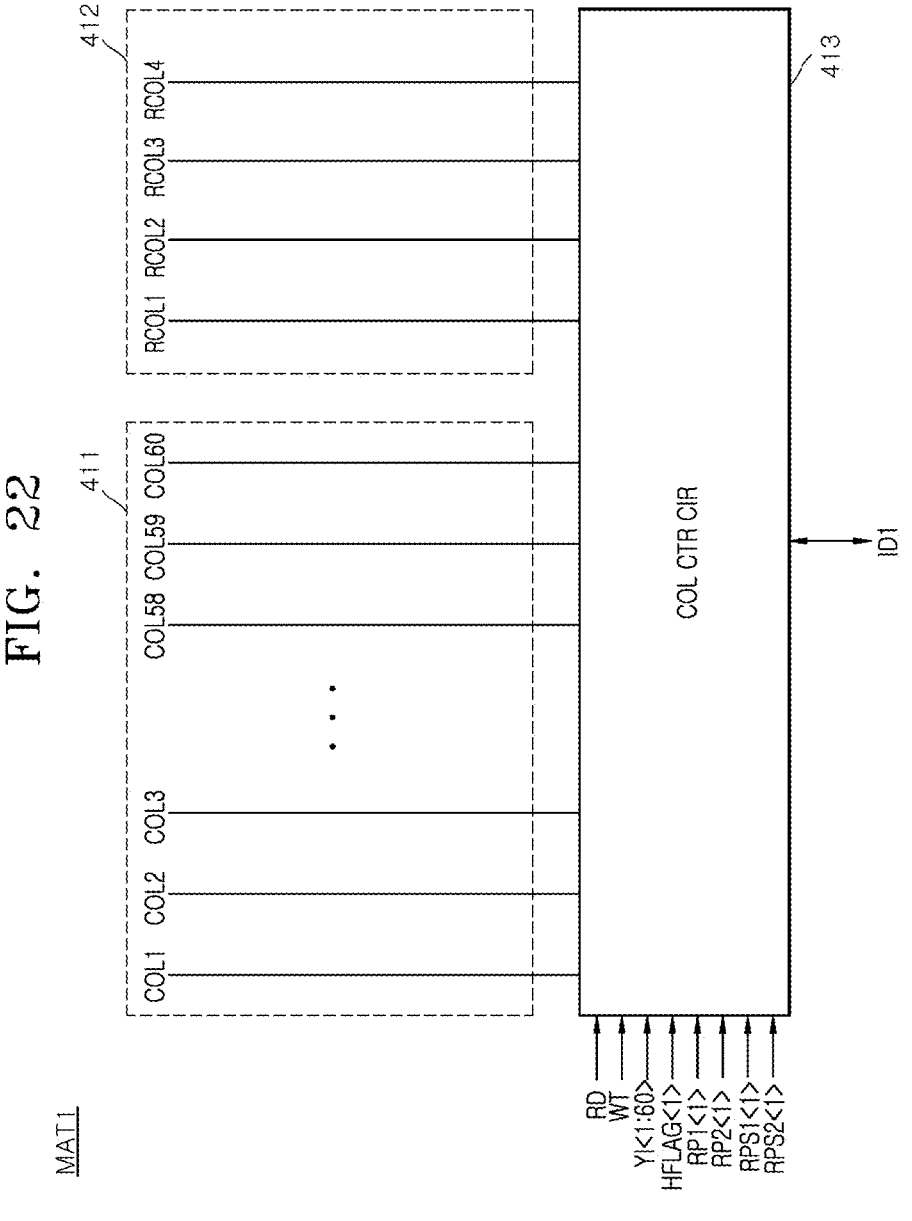
FIG. 22 is a block diagram illustrating embodiment of a first mat that is included in a memory circuit according to an embodiment of the present disclosure.

FIG. 22 is a block diagram illustrating an embodiment of the first mat MAT1 that is included, for example, in the memory circuit 280 shown in FIG. 19. In an embodiment, the first mat MAT1 includes a memory cell array 411, a repair region 412, and a column control circuit (COL CTR CIR) 413.

In an embodiment, the memory cell array 411 includes first column line COL1 through sixtieth column line COL60. A plurality of memory cells (not illustrated) is connected to each of the column lines COL1 to COL60. The plurality of memory cells that is connected to each of the column lines COL1 to COL60 outputs the first internal data ID1 after the start of a read operation during normal operation. The plurality of memory cells that is connected to each of the column lines COL1 to COL60 stores the first internal data ID1 after the start of a write operation during normal operation. In an embodiment, the memory cell array 411 includes a first quantity of column lines, such as 60 column lines. The quantity of column lines included in the memory cell array 411 may vary according to an embodiment.

In an embodiment, the repair region 412 includes first repair column line RCOL1, second repair column line RCOL2, third repair column line RCOL3, and fourth repair column line RCOL4. A plurality of memory cells (not illustrated) is connected to each of the repair column lines RCOL1, RCOL2, RCOL3, and RCOL4. The first repair column line RCOL1 is a column line substituted for a column line in which a fail occurred among the column lines COL1 to COL60 in which a fail occurred when the first bit RP<1> of the first repair signal is enabled. The second repair column line RCOL2 is a column line substituted for a column line in which a fail occurred among the column lines COL1 to COL60 in which a fail occurred when the first bit RP2<1> of the second repair signal is enabled. The third repair column line RCOL3 is a column line substituted for a column line in which a fail occurred among the column lines COL1 to COL60 in which a fail occurred when the first bit RPS1<1> of the first operation repair signal is enabled. The fourth repair column line RCOL4 is a column line substituted for a column line in which a fail occurred among the column lines COL1 to COL60 in which a fail occurred when the first bit RPS2<1> of the second operation repair signal is enabled.

The column control circuit 413 is electrically connected to the column lines COL1 to COL60 and the repair column lines RCOL1, RCOL2, RCOL3, and RCOL4.

The column control circuit 413 outputs the first internal data ID1 stored in the plurality of memory cells, by connecting one of the column lines COL1 to COL60 based on the first to sixtieth bits YI<1:60> of the column signal when the read command RD is enabled. The column control circuit 413 blocks the output of the first internal data ID1 when the read command RD is enabled and the first flag signal HFLAG<1> is enabled. The column control circuit 413 substitutes a column line in which a fail occurred, among the column lines COL1 to COL60, with the first repair column line RCOL1 when the read command RD is enabled and the first bit RP1<1> of the first repair signal is enabled. The column control circuit 413 is connected to the first repair column line RCOL1 when the read command RD is enabled and outputs the first internal data ID1 stored in the plurality of memory cells. The column control circuit 413 substitutes a column line in which a fail occurred, among the column lines COL1 to COL60, with the second repair column line RCOL2 when the read command RD is enabled and the first bit RP2<1> of the second repair signal is enabled. The column control circuit 413 is connected to the second repair column line RCOL2 when the read command RD is enabled and outputs the first internal data ID1 stored in the plurality of memory cells. The column control circuit 413 substitutes a column line in which a fail occurred, among the column lines COL1 to COL60, with the third repair column line RCOL3 when the read command RD is enabled and the first bit RPS1<1> of the first operation repair signal is enabled. The column control circuit 413 is connected to the third repair column line RCOL3 when the read command RD is enabled and outputs the first internal data ID1 stored in the plurality of memory cells. The column control circuit 413 substitutes a column line in which a fail occurred, among the column lines COL1 to COL60, with the fourth repair column line RCOL4 when the read command RD is enabled and the first bit RPS2<1> of the second operation repair signal is enabled. The column control circuit 413 is connected to the fourth repair column line RCOL4 when the read command RD is enabled and outputs the first internal data ID1 stored in the plurality of memory cells.

The column control circuit 413 stores the first internal data ID1 in the plurality of memory cells, by connecting one of the column lines COL1 to COL60 based on the first to sixtieth bits YI<1:60> of the column signal when the write command WT is enabled. The column control circuit 413 blocks the input of the first internal data ID1 when the write command WT is enabled and the first bit HFLAG<1> of the flag signal is enabled. The column control circuit 413 substitutes a column line in which a fail occurred, among the column lines COL1 to COL60 in which a fail occurred, with the first repair column line RCOL1 when the write command RD is enabled and the first bit RP1<1> of the first repair signal is enabled. The column control circuit 413 is connected to the first repair column line RCOL1 when the write command WT is enabled and stores the first internal data ID1 in the plurality of memory cells. The column control circuit 413 substitutes a column line in which a fail occurred, among the column lines COL1 to COL60 in which a fail occurred, with the second repair column line RCOL2 when the write command RD is enabled and the first bit RP2<1> of the second repair signal is enabled. The column control circuit 413 is connected to the second repair column line RCOL2 when the write command WT is enabled and stores the first internal data ID1 in the plurality of memory cells. The column control circuit 413 substitutes a column line in which a fail occurred, among the column lines COL1 to COL60 in which a fail occurred, with the third repair column line RCOL3 when the write command WT is enabled and the first bit RPS1<1> of the first operation repair signal is enabled. The column control circuit 413 is connected to the third repair column line RCOL3 when the write command WT is enabled, and stores the first internal data ID1 in the plurality of memory cells. The column control circuit 413 substitutes a column line in which a fail occurred, among the column lines COL1 to COL60 in which a fail occurred, with the fourth repair column line RCOL4 when the write command WT is enabled and the first bit RPS2<1> of the second operation repair signal is enabled. The column control circuit 413 is connected to the fourth repair column line RCOL3 when the write command WT is enabled and stores the first internal data ID1 in the plurality of memory cells.

Each of the second mat MAT2 through the sixteenth mat MAT16 is implemented using the same circuit as the first mat MAT1 illustrated in FIG. 22 and performs the same operation as the first mat MAT1, except that signals that are input to and output from the first mat MAT1 are different from signals that are input to and output from each of the mats MAT2 to MAT16. The meta region META is implemented using the same circuit as the circuit of the meta region META illustrated in FIG. 6 and performs the same operation as the meta region META illustrated in FIG. 6.

As described, the semiconductor system 1 according to an embodiment of the present disclosure uses the meta region META in which meta data are stored as a region in which meta data are stored or a region in which internal data are stored, based on whether meta mode is enabled. The semiconductor system 1 may reduce the quantity of column lines of a mat in which internal data are stored and may reduce an area by using the meta region META in which meta data are stored as a region in which internal data are stored.

Figure 23:
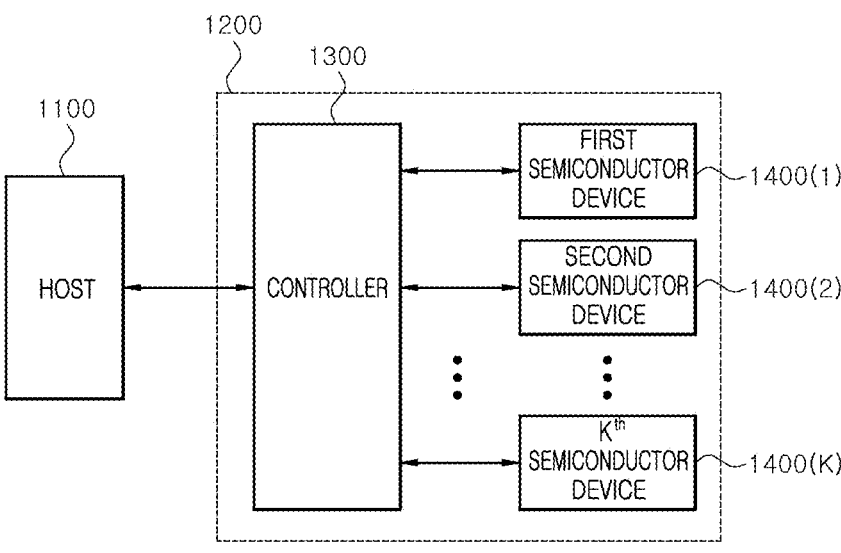
FIG. 23 is a diagram illustrating an embodiment of an electronic system according to an embodiment of the present disclosure.

FIG. 23 is a block diagram illustrating an embodiment of an electronic system 1000 according to an embodiment of the present disclosure. As illustrated in FIG. 23, in an embodiment, the electronic system 1000 includes a host 1100 and a semiconductor system 1200.

The host 1100 and the semiconductor system 1200 mutually transmit signals according to an interface protocol. The interface protocol used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), a serial attached SCSI (SAS), a universal serial bus (USB), and so forth.

In an embodiment, the semiconductor system 1200 includes a controller 1300 and semiconductor devices 1400 (1:K). The controller 1300 controls the semiconductor devices 1400(1:K) such that the semiconductor devices 1400(1:K) perform normal mode and meta mode. Each of the semiconductor devices 1400(1:K) uses the meta region META as a region in which meta data are stored or a region in which internal data are stored, depending on whether meta mode is enabled. Each of the semiconductor devices 1400 (1:K) may reduce the quantity of column lines of a mat in which internal data are stored and may reduce an area by using the meta region META in which meta data are stored as a region in which internal data are stored.

The controller 1300 may be similarly implemented as the controller 10 illustrated in FIG. 1. Each of the semiconductor devices 1400(1:K) may be similarly implemented as any of the semiconductor device 20 illustrated in FIG. 1, the semiconductor device 20A illustrated in FIG. 2, the semiconductor device 20B illustrated in FIG. 13, or the semiconductor device 20C illustrated in FIG. 19. According to an embodiment, each of the semiconductor devices 1400(1:K) may be implemented as one of dynamic random access memory (DRAM), phase change random access memory (PRAM), resistive random access memory (RRAM), magnetic random access memory (MRAM), ferroelectric random access memory (FRAM), and so forth.

Although the detailed embodiments of the present disclosure are described in the present disclosure, those skilled in the art will understand that various modifications, additions, and substitutions related to these embodiments are possible without departing from the scope and technical concepts of the present disclosure. Therefore, the scope of the present disclosure should not be limited to the foregoing embodiments. All changes within the meaning and range of equivalency of the claims are included within their scope.

What is claimed is:

1. A semiconductor device comprising:
   a memory circuit comprising a first mat, a second mat, a third mat, a fourth mat, and a meta region and configured to block output of one of first internal data, second internal data, third internal data, and fourth internal data stored in the first mat, the second mat, the third mat, and the fourth mat based on a column signal and a plurality of flag signals that are generated by performing a computational operation on an address during normal mode and configured to output fifth internal data from the meta region; and
   a data input and output circuit configured to generate first data, second data, third data, and fourth data from the first internal data, the second internal data, the third internal data, the fourth internal data, and the fifth internal data based on a plurality of shifting signals.

2. The semiconductor device of claim 1,
   wherein the first mat, the second mat, the third mat, and the fourth mat output sixth internal data, seventh internal data, eighth internal data, and ninth internal data during meta mode; and
   wherein the meta region outputs tenth internal data comprising error information for the sixth internal data, the seventh internal data, the eighth internal data, and the ninth internal data during meta mode.

3. The semiconductor device of claim 1,
   wherein the first mat, the second mat, the third mat, and the fourth mat comprise a first quantity of column lines; and
   wherein the meta region comprises a second quantity of column lines.

4. The semiconductor device of claim 3, wherein the meta region blocks data associated with a subset of the second quantity of column lines during meta mode.

5. The semiconductor device of claim 1, wherein the data input and output circuit comprises:
   a data selection circuit configured to shift the first internal data, the second internal data, the third internal data, and the fourth internal data based on the plurality of shifting signals and configured to generate first transfer data, second transfer data, third transfer data, and fourth transfer data based on the first internal data, the second internal data, the third internal data, and the fourth internal data that are shifted and the fifth internal data; and a read write driving circuit configured to generate the first data, the second data, the third data, and the fourth data from the first transfer data, the second transfer data, the third transfer data, and the fourth transfer data and output the first data, the second data, the third data, and the fourth data when a read command is input.

6. The semiconductor device of claim 5, wherein the data selection circuit comprises:

a first multiplexer configured to generate the first transfer data from one of the first internal data and the second internal data based on a first shifting signal of the plurality of shifting signals;

a second multiplexer configured to generate the second transfer data from one of the second internal data and the third internal data based on a second shifting signal of the plurality of shifting signals;

a third multiplexer configured to generate the third transfer data from one of the third internal data and the fourth internal data based on a third shifting signal of the plurality of shifting signals; and a fourth multiplexer configured to generate the fourth transfer data from one of the fourth internal data and the fifth internal data based on a fourth shifting signal of the plurality of shifting signals.

7. The semiconductor device of claim 1, further comprising a memory control circuit configured to generate the column signal by performing the computational operation on the address based on a meta control signal and configured to generate the plurality of flag signals and the plurality of shifting signals.

8. The semiconductor device of claim 7, wherein the meta control signal is a signal that is enabled during meta mode in which the meta region outputs tenth internal data comprising error information for sixth internal data, seventh internal data, eighth internal data, and ninth internal data stored in the first mat, the second mat, the third mat, and the fourth mat.

9. The semiconductor device of claim 7, wherein the memory control circuit comprises:

an address decoder configured to generate an internal address by decoding the address;

a column signal generation circuit configured to mask a subset of bits of the internal address when the meta control signal is disabled and configured to generate the column signal by performing a computational operation on the internal address;

a flag signal generation circuit configured to generate the plurality of flag signals by performing a computational operation on the address when the meta control signal is disabled; and a shifting signal generation circuit configured to generate the plurality of shifting signals from the plurality of flag signals when the meta control signal is disabled.

10. A semiconductor device comprising:

a memory circuit comprising a first mat, a second mat, a third mat, a fourth mat, and a meta region, configured to repair a column line at a location where a fail occurred when an address has a logic level combination that selects a column line at a location where a fail occurred in normal mode, configured to block output of one of first internal data, second internal data, third internal data, and fourth internal data stored in the first mat, the second mat, the third mat, and the fourth mat based on a column signal and a plurality of flag signals that are generated by performing a computational operation on the address, and configured to output fifth internal data from the meta region; and a data input and output circuit configured to generate first data, second data, third data, and fourth data from the first internal data, the second internal data, the third internal data, the fourth internal data, and the fifth internal data based on a plurality of shifting signals.

11. The semiconductor device of claim 10, wherein each of the first mat, the second mat, the third mat, and the fourth mat comprises a plurality of column lines and a plurality of repair column lines; and wherein the column line at the location where the fail occurred, among the plurality of column lines, is substituted with one of the plurality of repair column lines.

12. The semiconductor device of claim 10, wherein the meta region comprises a plurality of column lines; and wherein the meta region blocks data associated with a subset of the plurality of column lines during meta mode.

13. The semiconductor device of claim 10, wherein the data input and output circuit comprises:

a data selection circuit configured to shift the first internal data, the second internal data, the third internal data, and the fourth internal data based on the plurality of shifting signals and configured to generate first transfer data, second transfer data, third transfer data, and fourth transfer data based on the first internal data, the second internal data, the third internal data, and the fourth internal data that are shifted and the fifth internal data; and a read write driving circuit configured to generate the first data, the second data, the third data, and the fourth data from the first transfer data, the second transfer data, the third transfer data, and the fourth transfer data and output the first data, the second data, the third data, and the fourth data when a read command is input.

14. The semiconductor device of claim 13, wherein the data selection circuit comprises:

a first multiplexer configured to generate the first transfer data from one of the first internal data and the second internal data based on a first shifting signal of the plurality of shifting signals;

a second multiplexer configured to generate the second transfer data from one of the second internal data and the third internal data based on a second shifting signal of the plurality of shifting signals;

a third multiplexer configured to generate the third transfer data from one of the third internal data and the fourth internal data based on a third shifting signal of the plurality of shifting signals; and a fourth multiplexer configured to generate the fourth transfer data from one of the fourth internal data and the fifth internal data based on a fourth shifting signal of the plurality of shifting signals.

15. The semiconductor device of claim 10, further comprising a memory control circuit configured to generate the column signal by performing the computational operation on the address based on the meta control signal, configured to generate a repair signal when the address has a logic level combination that selects the column line at the location at which the fail occurred, and configured to generate the plurality of flag signals and the plurality of shifting signals by performing the computational operation on the address.

16. The semiconductor device of claim 15, wherein the memory control circuit comprises:

an address decoder configured to generate an internal address by decoding the address;

a column signal generation circuit configured to mask a subset of bits of the internal address when the meta control signal is disabled and configured to generate the column signal by performing a computational operation on the internal address;

a repair control circuit configured to generate the repair signal when the address has a logic level combination that selects the column line at the location where the fail occurred;

a flag signal generation circuit configured to generate the plurality of flag signals by performing the computational operation on the address when the meta control signal is disabled; and a shifting signal generation circuit configured to generate the plurality of shifting signals from the plurality of flag signals when the meta control signal is disabled.

17. A semiconductor device comprising:

a memory control circuit configured to generate a column signal by performing a computational operation on an address based on a meta control signal and configured to generate a plurality of masking signals by performing the computational operation on the address;

a memory circuit comprising a first mat, a second mat, a third mat, a fourth mat, and a meta region, configured to output first internal data, second internal data, third internal data, and fourth internal data stored in the first mat, the second mat, the third mat, and the fourth mat based on the column signal in normal mode, and configured to output fifth internal data from the meta region; and a data input and output circuit configured to generate first data, second data, third data, and fourth data based on the first internal data, the second internal data, the third internal data, the fourth internal data, and the fifth internal data, and configured to generate the first data, the second data, the third data, and the fourth data by blocking output of one of the first internal data, the second internal data, the third internal data, the fourth internal data based on the plurality of masking signals.

18. The semiconductor device of claim 17, wherein the first mat, the second mat, the third mat, and the fourth mats output sixth internal data, seventh internal data, eighth internal data, and ninth internal data during meta mode, and wherein the meta region outputs tenth internal data comprising error information for the sixth internal data, the seventh internal data, the eighth internal data, and the ninth internal data during meta mode.

19. The semiconductor device of claim 17, wherein the first mat, the second mat, the third mat, and the fourth mat comprise a first quantity of column lines, and wherein the meta region comprises a first quantity of column lines and a second quantity of column lines.

20. The semiconductor device of claim 19, wherein the meta region blocks data associated with the second quantity of column lines during meta mode.

21. The semiconductor device of claim 17, wherein the memory control circuit comprises:

an address decoder configured to generate an internal address by decoding the address;

a column signal generation circuit configured to mask a subset of bits of the internal address when the meta control signal is disabled, configured to generate the column signal by performing a computational operation on the internal address, and configured to generate the column signal based on the internal address when the meta control signal is enabled;

a flag signal generation circuit configured to generate a plurality of flag signals by performing the computational operation on the address when the meta control signal is disabled; and a masking signal generation circuit configured to generate the plurality of masking signals from the plurality of flag signals when the meta control signal is disabled.

22. The semiconductor device of claim 17, wherein the data input and output circuit comprises:

a data masking circuit configured to generate the first internal data, the second internal data, the third internal data, and the fourth internal data based on the plurality of masking signals and first transfer data, second transfer data, third transfer data, and fifth transfer data based on the fifth internal data; and a read write driving circuit configured to generate the first data, the second data, the third data, and the fourth data from the first transfer data, the second transfer data, the third transfer data, and the fifth transfer data and output the first data, the second data, the third data, and the fourth data when a read command is input.

23. The semiconductor device of claim 22 wherein the data masking circuit comprises:

a first switch circuit configured to block input of the first internal data or output the first internal data as the first transfer data based on a first masking signal of the plurality of masking signals;

a second switch circuit configured to block input of the second internal data or output the second internal data as the second transfer data based on a second masking signal of the plurality of masking signals;

a third switch circuit configured to block input of the third internal data or output the third internal data as the third transfer data based on a third masking signal of the plurality of masking signals;

a fourth switch circuit configured to block input of the fourth internal data or output the fourth internal data as fourth transfer data based on a fourth masking signal of the plurality of masking signals; and a fifth switch circuit configured to output the fifth internal data as the fifth transfer data.

24. A data input and output method comprising:

outputting first internal data, second internal data, third internal data, and fourth internal data stored in a first mat, a second mat, a third mat, and a fourth mat based on a column signal and a plurality of flag signals that are generated by performing a computational operation on an address in normal mode, blocking one of the first internal data, the second internal data, the third internal data, and the fourth internal data, and outputting fifth internal data stored in a meta region; and generating first data, second data, third data, and fourth data from the first internal data, the second internal data, the third internal data, the fourth internal data, and the fifth internal data based on a plurality of shifting signals and outputting the first data, the second data, the third data, and the fourth data.

25. The data input and output method of claim 24, wherein the first mat, the second mat, the third mat, and the fourth mats comprise a first quantity of column lines, and wherein the meta region comprises a second quantity of column lines.

26. The data input and output method of claim 24, wherein the internal data output process comprises outputting sixth internal data, seventh internal data, eighth internal data, and ninth internal data stored in the first mat, the second mat, the third mat, and the fourth mat and outputting tenth internal data stored in the meta region based on the column signal that is generated based on the address during meta mode.

27. The data input and output method of claim 26, wherein generating comprises generating the first data, the second data, the third data, the fourth data, fifth data, sixth data, seventh data, eighth data, ninth data, and tenth data based on the sixth internal data, the seventh internal data, the eighth internal data, the ninth internal data, and the tenth internal data and outputting the first data, the second data, the third data, the fourth data, the fifth data, the sixth data, the seventh data, the eighth data, the ninth data, and the tenth data during meta mode.

28. The data input and output method of claim 24, wherein outputting comprises outputting the first internal data, the second internal data, the third internal data, and the fourth internal data by blocking one of the first internal data, the second internal data, the third internal data, and the fourth internal data, and outputting the fifth internal data by substituting a column line at a location where a fail occurred with one of a plurality of repair column lines when the address has a logic level combination that selects the column line at the location where the fail occurred during normal mode.

29. A semiconductor device comprising:

a memory circuit comprising a plurality of mats and a meta region and configured to block output of first internal data stored in the plurality of mats based on a column signal and a plurality of flag signals that are generated by performing a computational operation on an address during normal mode and configured to output second internal data from the meta region; and a data input and output circuit configured to generate a plurality of data from the first internal data and the second internal data based on a plurality of shifting signals.

* * * * *